United States Patent
Chen et al.

(10) Patent No.: US 10,065,525 B2
(45) Date of Patent: Sep. 4, 2018

(54) ADJUSTING ELECTRIC VEHICLE SYSTEMS BASED ON AN ELECTRICAL ENERGY STORAGE DEVICE THERMAL PROFILE

(71) Applicant: Gogoro Inc., Hong Kong (CN)

(72) Inventors: Ching Chen, Taipei (TW); Yi-Tsung Wu, New Taipei (TW); Hok-Sum Horace Luke, Mercer Island, WA (US); Matthew Whiting Taylor, North Bend, WA (US)

(73) Assignee: Gogoro Inc., Hong Kong (CN)

( * ) Notice: Subject to any disclaimer, the term of this patent is extended or adjusted under 35 U.S.C. 154(b) by 0 days.

(21) Appl. No.: 14/453,119

(22) Filed: Aug. 6, 2014

(65) Prior Publication Data

US 2015/0046012 A1 Feb. 12, 2015

Related U.S. Application Data

(60) Provisional application No. 61/862,854, filed on Aug. 6, 2013.

(51) Int. Cl.
*B60L 11/18* (2006.01)
*B60L 3/12* (2006.01)
(Continued)

(52) U.S. Cl.
CPC .......... *B60L 11/1872* (2013.01); *B60L 1/00* (2013.01); *B60L 3/12* (2013.01); *H01M 10/425* (2013.01);
(Continued)

(58) Field of Classification Search
CPC ........... G06F 7/00; B60L 11/1872; B60L 3/12
See application file for complete search history.

(56) References Cited

U.S. PATENT DOCUMENTS

| 1,387,848 A | 8/1921 | Good |
| 3,664,450 A | 5/1972 | Udden et al. |

(Continued)

FOREIGN PATENT DOCUMENTS

| CA | 2 865 976 A1 | 9/2013 |
| DE | 102012000847 A1 | 7/2012 |

(Continued)

OTHER PUBLICATIONS

"Inrunner," 10ikipedia from URL=http://en.wikipedia.org/w/index.php?title=Inrunner&printable=yes on Sep. 28, 2011, 1 page.
(Continued)

*Primary Examiner* — Aaron L Troost
(74) *Attorney, Agent, or Firm* — Perkins Coie LLP

(57) ABSTRACT

Electric vehicles such as scooters are reliant upon one or more electrical energy storage devices to not only provide motive power but also power some or all vehicular systems. An electrical energy storage device can be equipped with a number of thermal sensors that provide data indicative of overall and/or localized electrical energy storage device temperature(s) to a controller. In order to maintain the electrical energy storage device in a desired thermal operating range or profile, the controller can selectively alter or control the power distributed or allocated to one or more vehicular systems. Such alteration or control of power allocation may be performed by the controller based upon an assessed degree of vehicular system criticality.

29 Claims, 9 Drawing Sheets

(51) Int. Cl.
  *B60L 1/00* (2006.01)
  *H01M 10/42* (2006.01)
  *H01M 10/44* (2006.01)
  *H01M 10/48* (2006.01)

(52) U.S. Cl.
  CPC ....... *H01M 10/443* (2013.01); *H01M 10/486* (2013.01); *B60L 2200/12* (2013.01); *B60L 2240/545* (2013.01); *H01M 2220/20* (2013.01); *Y02T 10/7005* (2013.01); *Y02T 10/705* (2013.01)

(56) References Cited

U.S. PATENT DOCUMENTS

| | | |
|---|---|---|
| 3,678,455 A | 7/1972 | Levey |
| 4,087,895 A | 5/1978 | Etienne |
| 4,216,839 A | 8/1980 | Gould et al. |
| 5,187,423 A | 2/1993 | Marton |
| 5,189,325 A | 2/1993 | Jarczynski |
| 5,236,069 A | 8/1993 | Peng |
| 5,339,250 A | 8/1994 | Durbin |
| 5,349,535 A | 9/1994 | Gupta |
| 5,416,702 A * | 5/1995 | Kitagawa ............... B60L 1/003 180/65.31 |
| 5,544,784 A | 8/1996 | Malaspina |
| 5,596,261 A | 1/1997 | Suyama |
| 5,627,752 A | 5/1997 | Buck et al. |
| 5,631,536 A | 5/1997 | Tseng |
| 5,642,270 A | 6/1997 | Green et al. |
| 5,815,824 A | 9/1998 | Saga et al. |
| 5,839,800 A | 11/1998 | Koga et al. |
| 5,898,282 A | 4/1999 | Drozdz et al. |
| 5,998,963 A | 12/1999 | Aarseth |
| 6,016,882 A | 1/2000 | Ishikawa |
| 6,177,867 B1 | 1/2001 | Simon et al. |
| 6,177,879 B1 | 1/2001 | Kokubu et al. |
| 6,403,251 B1 | 6/2002 | Baggaley et al. |
| 6,498,457 B1 | 12/2002 | Tsuboi |
| 6,515,580 B1 | 2/2003 | Isoda et al. |
| 6,583,592 B2 | 6/2003 | Omata et al. |
| 6,593,713 B2 | 7/2003 | Morimoto et al. |
| 6,796,396 B2 | 9/2004 | Kamen et al. |
| 6,822,560 B2 | 11/2004 | Geber et al. |
| 6,854,773 B2 | 2/2005 | Lin |
| 6,899,268 B2 | 5/2005 | Hara |
| 6,952,795 B2 | 10/2005 | O'Gorman et al. |
| 7,010,682 B2 | 3/2006 | Reinold et al. |
| 7,111,179 B1 | 9/2006 | Girson et al. |
| 7,131,005 B2 | 10/2006 | Levenson et al. |
| 7,392,068 B2 | 6/2008 | Dayan et al. |
| 7,415,332 B2 | 8/2008 | Ito et al. |
| 7,426,910 B2 | 9/2008 | Elwart |
| 7,495,543 B2 | 2/2009 | Denison et al. |
| 7,567,166 B2 | 7/2009 | Bourgine De Meder |
| 7,592,728 B2 | 9/2009 | Jones et al. |
| 7,617,893 B2 | 11/2009 | Syed et al. |
| 7,761,307 B2 | 7/2010 | Ochi et al. |
| 7,778,746 B2 | 8/2010 | McLeod et al. |
| 7,868,591 B2 | 1/2011 | Phillips et al. |
| 7,898,439 B2 | 3/2011 | Bettez et al. |
| 7,908,020 B2 | 3/2011 | Pieronek |
| 7,948,207 B2 | 5/2011 | Scheucher |
| 7,979,147 B1 | 7/2011 | Dunn |
| 7,993,155 B2 | 8/2011 | Heichal et al. |
| 8,006,793 B2 | 8/2011 | Heichal et al. |
| 8,006,973 B2 | 8/2011 | Toba et al. |
| 8,013,571 B2 | 9/2011 | Agassi et al. |
| 8,035,341 B2 | 10/2011 | Genzel et al. |
| 8,035,349 B2 | 10/2011 | Lubawy |
| 8,063,762 B2 | 11/2011 | Sid |
| 8,068,952 B2 | 11/2011 | Valentine et al. |
| 8,098,050 B2 | 1/2012 | Takahashi |
| 8,106,631 B2 | 1/2012 | Abe |
| 8,118,132 B2 | 2/2012 | Gray, Jr. |
| 8,164,300 B2 | 4/2012 | Agassi et al. |
| 8,229,625 B2 | 7/2012 | Lal et al. |
| 8,265,816 B1 | 9/2012 | LaFrance |
| 8,301,365 B2 | 10/2012 | Niwa et al. |
| 8,326,259 B2 | 12/2012 | Gautama et al. |
| 8,354,768 B2 | 1/2013 | Cipriani |
| 8,378,627 B2 | 2/2013 | Asada et al. |
| 8,412,401 B2 | 4/2013 | Bertosa et al. |
| 8,417,401 B2 | 4/2013 | Takahara et al. |
| 8,437,908 B2 | 5/2013 | Goff et al. |
| 8,560,147 B2 | 10/2013 | Taylor et al. |
| 8,564,241 B2 | 10/2013 | Masuda |
| 8,614,565 B2 | 12/2013 | Lubawy |
| 2001/0018903 A1 | 9/2001 | Hirose et al. |
| 2002/0023789 A1 | 2/2002 | Morisawa et al. |
| 2002/0070851 A1 | 6/2002 | Raichle et al. |
| 2003/0141840 A1 | 7/2003 | Sanders |
| 2003/0163434 A1 | 8/2003 | Barends |
| 2003/0209375 A1 | 11/2003 | Suzuki et al. |
| 2004/0236615 A1 | 11/2004 | Msndy |
| 2004/0246119 A1 | 12/2004 | Martin et al. |
| 2005/0247446 A1 | 11/2005 | Gawthrop |
| 2006/0046895 A1 | 3/2006 | Thacher et al. |
| 2006/0047380 A1 | 3/2006 | Welch |
| 2006/0208850 A1 | 9/2006 | Ikeuchi et al. |
| 2006/0284601 A1 | 12/2006 | Salasoo et al. |
| 2007/0013347 A1 | 1/2007 | Kamohara et al. |
| 2007/0026996 A1 | 2/2007 | Ayabe et al. |
| 2007/0035397 A1 | 2/2007 | Patenaude et al. |
| 2007/0080662 A1 * | 4/2007 | Wu ....................... B60L 3/0046 320/110 |
| 2007/0090921 A1 | 4/2007 | Fisher |
| 2007/0159297 A1 | 7/2007 | Paulk et al. |
| 2007/0175429 A1 | 8/2007 | Yanagida et al. |
| 2007/0208468 A1 | 9/2007 | Sankaran et al. |
| 2009/0024872 A1 | 1/2009 | Beverly |
| 2009/0033456 A1 | 2/2009 | Castillo et al. |
| 2009/0082957 A1 | 3/2009 | Agassi et al. |
| 2009/0112394 A1 | 4/2009 | Lepejian et al. |
| 2009/0139781 A1 * | 6/2009 | Straubel ............. B60L 11/1875 180/65.1 |
| 2009/0273235 A1 | 11/2009 | Ichikawa |
| 2009/0294188 A1 | 12/2009 | Cole |
| 2010/0026238 A1 | 2/2010 | Suzuki et al. |
| 2010/0051363 A1 | 3/2010 | Inoue et al. |
| 2010/0052588 A1 | 3/2010 | Okamura et al. |
| 2010/0089547 A1 | 4/2010 | King et al. |
| 2010/0094496 A1 | 4/2010 | Hershkovitz et al. |
| 2010/0114798 A1 | 5/2010 | Sirton |
| 2010/0114800 A1 | 5/2010 | Yasuda et al. |
| 2010/0161481 A1 | 6/2010 | Littrell |
| 2010/0201482 A1 | 8/2010 | Robertson et al. |
| 2010/0235043 A1 | 9/2010 | Seta et al. |
| 2010/0241376 A1 | 9/2010 | Kikuchi et al. |
| 2010/0250043 A1 | 9/2010 | Scheucher |
| 2010/0308989 A1 | 12/2010 | Gasper |
| 2011/0025267 A1 | 2/2011 | Kamen et al. |
| 2011/0029157 A1 | 2/2011 | Muzaffer |
| 2011/0032110 A1 | 2/2011 | Taguchi |
| 2011/0043165 A1 * | 2/2011 | Kinser .................... B60L 1/003 320/109 |
| 2011/0071932 A1 | 3/2011 | Agassi et al. |
| 2011/0106329 A1 | 5/2011 | Donnelly et al. |
| 2011/0112710 A1 | 5/2011 | Meyer-Ebeling et al. |
| 2011/0114798 A1 | 5/2011 | Gemmati |
| 2011/0120789 A1 | 5/2011 | Teraya |
| 2011/0148346 A1 | 6/2011 | Gagosz et al. |
| 2011/0153141 A1 | 6/2011 | Beechie et al. |
| 2011/0160992 A1 | 6/2011 | Crombez |
| 2011/0169447 A1 | 7/2011 | Brown et al. |
| 2011/0200193 A1 | 8/2011 | Blitz et al. |
| 2011/0202476 A1 | 8/2011 | Nagy et al. |
| 2011/0224900 A1 | 9/2011 | Hiruta et al. |
| 2011/0260691 A1 | 10/2011 | Ishibashi et al. |
| 2011/0270480 A1 | 11/2011 | Ishibashi et al. |
| 2011/0279257 A1 | 11/2011 | Au et al. |
| 2011/0288723 A1 * | 11/2011 | Weiss ..................... G01K 15/00 701/29.2 |
| 2011/0292667 A1 | 12/2011 | Meyers |
| 2011/0295454 A1 | 12/2011 | Meyers |

(56) References Cited

U.S. PATENT DOCUMENTS

| | | |
|---|---|---|
| 2011/0303509 A1 | 12/2011 | Agassi et al. |
| 2012/0000720 A1 | 1/2012 | Honda et al. |
| 2012/0013304 A1* | 1/2012 | Murase .............. B60L 11/1864 320/116 |
| 2012/0019196 A1 | 1/2012 | Fung |
| 2012/0038473 A1 | 2/2012 | Fecher |
| 2012/0062361 A1 | 3/2012 | Kosugi |
| 2012/0068817 A1 | 3/2012 | Fisher |
| 2012/0078413 A1 | 3/2012 | Baker, Jr. |
| 2012/0091964 A1* | 4/2012 | Vance ................. B60L 3/0046 320/122 |
| 2012/0105078 A1 | 5/2012 | Kikuchi et al. |
| 2012/0109519 A1 | 5/2012 | Uyeki |
| 2012/0123661 A1 | 5/2012 | Gray, Jr. |
| 2012/0126969 A1 | 5/2012 | Wilbur et al. |
| 2012/0143410 A1 | 6/2012 | Gallagher et al. |
| 2012/0158229 A1 | 6/2012 | Schaefer |
| 2012/0194346 A1 | 8/2012 | Tsai et al. |
| 2012/0248868 A1 | 10/2012 | Mobin et al. |
| 2012/0248869 A1 | 10/2012 | Itagaki et al. |
| 2012/0256588 A1 | 10/2012 | Hayashi et al. |
| 2012/0259665 A1 | 10/2012 | Pandhi et al. |
| 2012/0296512 A1 | 11/2012 | Lee et al. |
| 2012/0299537 A1 | 11/2012 | Kikuchi |
| 2012/0316671 A1 | 12/2012 | Hammerslag et al. |
| 2013/0024306 A1 | 1/2013 | Shah et al. |
| 2013/0026971 A1 | 1/2013 | Luke et al. |
| 2013/0026972 A1 | 1/2013 | Luke et al. |
| 2013/0026973 A1 | 1/2013 | Luke et al. |
| 2013/0027183 A1 | 1/2013 | Wu et al. |
| 2013/0030580 A1 | 1/2013 | Luke et al. |
| 2013/0030581 A1 | 1/2013 | Luke et al. |
| 2013/0030630 A1 | 1/2013 | Luke et al. |
| 2013/0030696 A1 | 1/2013 | Wu et al. |
| 2013/0030920 A1 | 1/2013 | Wu et al. |
| 2013/0031318 A1 | 1/2013 | Chen et al. |
| 2013/0033203 A1 | 2/2013 | Luke et al. |
| 2013/0046457 A1 | 2/2013 | Pettersson |
| 2013/0074411 A1 | 3/2013 | Ferguson et al. |
| 2013/0090795 A1 | 4/2013 | Luke et al. |
| 2013/0093271 A1 | 4/2013 | Luke et al. |
| 2013/0093368 A1 | 4/2013 | Luke et al. |
| 2013/0093384 A1 | 4/2013 | Nyu et al. |
| 2013/0108904 A1* | 5/2013 | Okabayashi ........ H01M 10/486 429/90 |
| 2013/0116892 A1 | 5/2013 | Wu et al. |
| 2013/0119898 A1 | 5/2013 | Ohkura |
| 2013/0127416 A1 | 5/2013 | Karner et al. |
| 2013/0132307 A1 | 5/2013 | Phelps et al. |
| 2013/0151049 A1 | 6/2013 | Higashitani et al. |
| 2013/0154355 A1* | 6/2013 | An ........................... B60L 1/00 307/9.1 |
| 2013/0166119 A1 | 6/2013 | Kummer et al. |
| 2013/0181582 A1 | 7/2013 | Luke et al. |
| 2013/0200845 A1 | 8/2013 | Bito |
| 2013/0221928 A1 | 8/2013 | Kelty et al. |
| 2013/0254097 A1 | 9/2013 | Marathe et al. |
| 2013/0282254 A1 | 10/2013 | Dwan et al. |
| 2013/0294479 A1* | 11/2013 | Ichikawa ............ H01M 10/425 374/109 |
| 2014/0028089 A1 | 1/2014 | Luke et al. |
| 2014/0111121 A1 | 4/2014 | Wu |
| 2014/0142786 A1 | 5/2014 | Huang et al. |
| 2014/0368032 A1 | 12/2014 | Doerndorfer |
| 2015/0005982 A1 | 1/2015 | Muthukumar |

FOREIGN PATENT DOCUMENTS

| | | | |
|---|---|---|---|
| EP | 0 693 813 A1 | 1/1996 | |
| EP | 1 798 100 A2 | 6/2007 | |
| EP | 2 101 390 A2 | 9/2009 | |
| EP | 2 230 146 A2 | 9/2010 | |
| EP | 2365603 A2 | 9/2011 | |
| EP | 2 428 939 A1 | 3/2012 | |
| JP | 5-38003 A | 2/1993 | |
| JP | 6-153304 A | 5/1994 | |
| JP | 07-031008 A | 1/1995 | |
| JP | 7-36504 U | 7/1995 | |
| JP | 8-178683 A | 7/1996 | |
| JP | 9-119839 A | 5/1997 | |
| JP | 10-117406 A | 5/1998 | |
| JP | 10-170293 A | 6/1998 | |
| JP | 10-307952 A | 11/1998 | |
| JP | 11-049079 | 2/1999 | |
| JP | 11-51681 A | 2/1999 | |
| JP | 11-55869 A | 2/1999 | |
| JP | 11-176487 A | 7/1999 | |
| JP | 11-205914 A | 7/1999 | |
| JP | 2000-102102 A | 4/2000 | |
| JP | 2000-102103 A | 4/2000 | |
| JP | 2000-287302 A | 10/2000 | |
| JP | 2000-341868 A | 12/2000 | |
| JP | 2001-128301 | 5/2001 | |
| JP | 2003-118397 | 4/2003 | |
| JP | 2003-262525 A | 9/2003 | |
| JP | 2003-335230 A | 11/2003 | |
| JP | 2005-67453 A | 3/2005 | |
| JP | 2006-121874 A | 5/2006 | |
| JP | 2007-259600 A | 10/2007 | |
| JP | 2007-325458 A | 12/2007 | |
| JP | 2008-16229 A | 1/2008 | |
| JP | 2008-301598 A | 12/2008 | |
| JP | 2009-137456 A | 6/2009 | |
| JP | 2009-171646 A | 7/2009 | |
| JP | 2009-171647 A | 7/2009 | |
| JP | 4319289 B2 | 8/2009 | |
| JP | 2009-303364 A | 12/2009 | |
| JP | 2010-022148 A | 1/2010 | |
| JP | 2010-191636 A | 9/2010 | |
| JP | 2010-200405 A | 9/2010 | |
| JP | 2010-225528 A | 10/2010 | |
| JP | 2010-259238 A | 11/2010 | |
| JP | 2010-240907 A | 12/2010 | |
| JP | 2010-269686 A | 12/2010 | |
| JP | 2011-102801 A | 5/2011 | |
| JP | 2011-122926 A | 6/2011 | |
| JP | 2011-126452 | 6/2011 | |
| JP | 2011-131631 A | 7/2011 | |
| JP | 2011-142704 A | 7/2011 | |
| JP | 2012-151916 A | 8/2012 | |
| JP | 2012-153294 A | 8/2012 | |
| JP | 2012-214060 A | 11/2012 | |
| KR | 1998-045020 U | 9/1998 | |
| KR | 2004-0005146 A | 1/2004 | |
| KR | 20100012401 A | 2/2010 | |
| KR | 10-0971278 B1 | 7/2010 | |
| KR | 20110004292 A | 1/2011 | |
| KR | 20110041783 A | 4/2011 | |
| KR | 20120020554 A | 3/2012 | |
| TW | 200836452 A | 9/2008 | |
| TW | I315116 B | 9/2009 | |
| TW | M371880 U1 | 1/2010 | |
| TW | M379269 U1 | 4/2010 | |
| TW | M379789 U1 | 5/2010 | |
| TW | M385047 U1 | 7/2010 | |
| TW | 201043986 A1 | 12/2010 | |
| TW | 201044266 A1 | 12/2010 | |
| WO | 98/21132 A1 | 5/1998 | |
| WO | 2009/039454 A1 | 3/2009 | |
| WO | 2010/033517 A2 | 3/2010 | |
| WO | 2010/115573 A1 | 10/2010 | |
| WO | 2010/143483 A1 | 12/2010 | |
| WO | 2011/138205 A1 | 11/2011 | |
| WO | 2012/085992 A1 | 6/2012 | |
| WO | 2012/160407 A1 | 11/2012 | |
| WO | 2012/160557 A2 | 11/2012 | |
| WO | 2013/024483 A2 | 2/2013 | |
| WO | 2013/024484 A1 | 2/2013 | |
| WO | 2013/074819 A1 | 5/2013 | |
| WO | 2013/080211 A1 | 6/2013 | |
| WO | 2013/102894 A1 | 7/2013 | |
| WO | 2013/108246 A2 | 7/2013 | |
| WO | 2013/118113 A2 | 8/2013 | |

(56) References Cited

FOREIGN PATENT DOCUMENTS

| WO | 2013/128007 A2 | 9/2013 |
|---|---|---|
| WO | 2013/128009 A2 | 9/2013 |
| WO | 2013/128009 A3 | 9/2013 |
| WO | 2013/142154 A1 | 9/2013 |
| WO | 2013/144951 A1 | 10/2013 |

OTHER PUBLICATIONS

"Outrunner," 10ikipedia from URL=http://en.wikipedia.org/w/index.php?title=Outrunner&printable=yes on Sep. 16, 2011, 2 pages.
Chen et al., "Adjusting Electric Vehicle Systems Based on an Electrical Energy Storage Device Thermal Profile," U.S. Appl. No. 61/862,854, filed Aug. 6, 2013, 74 pages.
Chen et al., "Apparatus, System, and Method for Authentication of Vehicular Components ," U.S. Appl. No. 61/783,041, filed Mar. 14, 2013, 84 pages.
Chen et al., "Apparatus, System, and Method for Authentication of Vehicular Components," Office Action dated Nov. 22, 2013, for U.S. Appl. No. 13/918,703, 35 pages.
Chen et al., "Apparatus, System, and Method for Authentication of Vehicular Components," Notice of Allowance dated Mar. 25, 2014, for U.S. Appl. No. 13/918,703, 7 pages.
Chen et al., "Apparatus, System, and Method for Authentication of Vehicular Components," U.S. Appl. No. 13/918,703, filed Jun. 14, 2013, 84 pages.
Chen et al., "Apparatus, Method and Article for Providing Vehicle Diagnostic Data," Office Action dated Dec. 30, 2013, for U.S. Appl. No. 14/022,134, 20 pages.
Chen et al., "Apparatus, Method and Article for Providing Vehicle Diagnostic Data," U.S. Appl. No. 14/022,134, filed Sep. 9, 2013, 61 pages.
Chen et al., "Apparatus, Method and Article for Providing Vehicle Diagnostic Data," U.S. Appl. No. 61/601,404, filed Feb. 21, 2012, 56 pages.
Chen et al., "Systems and Methods for Powering Electric Vehicles Using a Single or Multiple Power Cells," U.S. Appl. No. 61/862,852, filed Aug. 6, 2013, 46 pages.
Communication pursuant to Rules 161(2) and 162 EPC, for corresponding European Patent Application No. 12817273.1, dated Mar. 25, 2014, 3 pages.
Communication pursuant to Rules 161(2) and 162 EPC, for corresponding European Patent Application No. 12817141.0, dated Mar. 26, 2014, 3 pages.
Communication pursuant to Rules 161(2) and 162 EPC, for corresponding European Patent Application No. 12818308.4, dated Mar. 26, 2014, 3 pages.
Communication pursuant to Rules 161(2) and 162 EPC, for corresponding European Patent Application No. 12817696.3, dated Mar. 27, 2014, 3 pages.
Communication pursuant to Rules 161(2) and 162 EPC, for corresponding European Patent Application No. 12817883.7, dated Mar. 27, 2014, 3 pages.
Communication pursuant to Rules 161(2) and 162 EPC, for corresponding European Patent Application No. 12818447.0, dated Mar. 27, 2014, 3 pages.
Huang et al., "Apparatus, Method and Article for Vehicle Turn Signals," U.S. Appl. No. 61/727,403, filed Nov. 16, 2012, 41 pages.
International Preliminary Report on Patentability and Written Opinion for corresponding International Patent Application No. PCT/US2012/048349, dated Jan. 28, 2014, 5 pages.
International Preliminary Report on Patentability and Written Opinion for corresponding International Patent Application No. PCT/US2012/048354, dated Jan. 28, 2014, 7 pages.
International Preliminary Report on Patentability and Written Opinion for corresponding International Patent Application No. PCT/US2012/048358, dated Jan. 28, 2014, 5 pages.
International Preliminary Report on Patentability and Written Opinion for corresponding International Patent Application No. PCT/US2012/048366, dated Jan. 28, 2014, 5 pages.
International Preliminary Report on Patentability and Written Opinion for corresponding International Patent Application No. PCT/US2012/048367, dated Jan. 28, 2014, 4 pages.
International Preliminary Report on Patentability and Written Opinion for corresponding International Patent Application No. PCT/US2012/048375, dated Jan. 28, 2014, 5 pages.
International Preliminary Report on Patentability and Written Opinion for corresponding International Patent Application No. PCT/US2012/048379, dated Jan. 28, 2014, 5 pages.
International Preliminary Report on Patentability and Written Opinion for corresponding International Patent Application No. PCT/US2012/048380, dated Jan. 28, 2014, 5 pages.
International Preliminary Report on Patentability and Written Opinion for corresponding International Patent Application No. PCT/US2012/048382, dated Jan. 28, 2014, 5 pages.
International Preliminary Report on Patentability and Written Opinion for corresponding International Patent Application No. PCT/US2012/048391, dated Jan. 28, 2014, 6 pages.
International Search Report and Written Opinion for corresponding International Patent Application No. PCT/US2012/048344, dated Feb. 28, 2013, 9 pages.
International Search Report and Written Opinion for corresponding International Patent Application No. PCT/US2012/048347, dated Dec. 18, 2012, 8 pages.
International Search Report and Written Opinion for corresponding International Patent Application No. PCT/US2012/048349, dated Feb. 18, 2013, 9 pages.
International Search Report and Written Opinion for corresponding International Patent Application No. PCT/US2012/048354, dated Feb. 18, 2013, 11 pages.
International Search Report and Written Opinion for corresponding International Patent Application No. PCT/US2012/048366, dated Jan. 21, 2013, 10 pages.
International Search Report and Written Opinion for corresponding International Patent Application No. PCT/US2012/048367, dated Jan. 17, 2013, 8 pages.
International Search Report and Written Opinion for corresponding International Patent Application No. PCT/US2012/048375, dated Jan. 23, 2013, 9 pages.
International Search Report and Written Opinion for corresponding International Patent Application No. PCT/US2012/048379, dated Dec. 17, 2012, 9 pages.
International Search Report and Written Opinion for corresponding International Patent Application No. PCT/US2012/048380, dated Feb. 27, 2013, 9 pages.
International Search Report and Written Opinion for corresponding International Patent Application No. PCT/US2012/048382, dated Feb. 27, 2013, 9 pages.
International Search Report and Written Opinion for corresponding International Patent Application No. PCT/US2012/063979, dated Mar. 4, 2013, 10 pages.
International Search Report and Written Opinion for corresponding International Application No. PCT/US2012/048391, dated Dec. 21, 2012, 9 pages.
International Search Report and Written Opinion for corresponding International Application No. PCT/US2012/058930, dated Mar. 15, 2013, 11 pages.
International Search Report and Written Opinion for corresponding International Application No. PCT/US2013/070131, dated Feb. 19, 2014, 17 pages.
International Search Report and Written Opinion for corresponding International Application No. PCT/US2013/065704, dated Feb. 13, 2014, 13 pages.
International Search Report and Written Opinion for corresponding International Patent Application No. PCT/US2012/048358, dated Feb. 25, 2013, 9 pages.
International Search Report and Written Opinion for corresponding International Application No. PCT/US2012/059931, dated Mar. 29, 2013, 13 pages.
Luke et al., "Portable Electrical Energy Storage Device," U.S. Appl. No. 61/872,126, filed Aug. 30, 2013, 39 pages.
Luke et al., "Apparatus, Method and Article for Authentication, Security and Control of Portable Charging Devices and Power

(56) References Cited

OTHER PUBLICATIONS

Storage Devices, Such as Batteries," Office Action dated Jan. 6, 2014, for U.S. Appl. No. 14/017,090, 19 pages.
Luke et al., "Apparatus, Method and Article for Authentication, Security and Control of Portable Charging Devices and Power Storage Devices, Such As Batteries," U.S. Appl. No. 14/017,090, filed Sep. 3, 2013, 69 pages.
Luke et al., "Apparatus, Method and Article for Authentication, Security and Control of Portable Charging Devices and Power Storage Devices, Such As Batteries," U.S. Appl. No. 61/773,621, filed Mar. 6, 2013, 69 pages.
Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.
Luke et al., "Detectible Indication of an Electric Motor Vehicle Standby Mode," Office Action for U.S. Appl. No. 13/646,320, dated May 30, 2013, 13 pages.
Luke et al., "Detectible Indication of an Electric Motor Vehicle Standby Mode," U.S. Appl. No. 61/543,720, filed Oct. 5, 2011, 35 pages.
Luke et al., "Detectible Indication of an Electric Motor Vehicle Standby Mode," U.S. Appl. No. 61/684,432, filed Aug. 17, 2012, 41 pages.
Luke et al., "Drive Assembly for Electric Powered Device," U.S. Appl. No. 61/546,411, filed Oct. 12, 2011, 18 pages.
Luke et al., "Electric Device Drive Assembly and Cooling System," U.S. Appl. No. 61/615,144, filed Mar. 23, 2012, 43 pages.
Luke et al., "Modular System for Collection and Distribution of Electric Storage Devices," U.S. Appl. No. 14/202,589, filed Mar. 10, 2014, 76 pages.
Luke et al., "Modular System for Collection and Distribution of Electric Storage Devices," U.S. Appl. No. 61/789,065, filed Mar. 15, 2013, 76 pages.
Luke et al., "Apparatus, Method and Article for Authentication, Security and Control of Power Storage Devices, Such As Batteries, Based on User Profiles," U.S. Appl. No. 61/534,772, filed Sep. 14, 2011, 55 pages.
Luke et al., "Apparatus, Method and Article for Authentication, Security and Control of Power Storage Devices, Such As Batteries," Office Action dated Feb. 26, 2014, for U.S. Appl. No. 13/559,038, 13 pages.
Luke et al., "Apparatus, Method and Article for Authentication, Security and Control of Power Storage Devices, Such As Batteries," Office Action dated Feb. 25, 2014, for U.S. Appl. No. 14/023,344, 12 pages.
Luke et al., "Apparatus, Method and Article for Authentication, Security and Control of Power Storage Devices, Such As Batteries," U.S. Appl. No. 61/534,761, filed Sep. 14, 2011, 55 pages.
Luke et al., "Apparatus, Method and Article for Collection, Charging and Distributing Power Storage Devices, Such As Batteries," U.S. Appl. No. 61/511,900, filed Jul. 26, 2011, 73 pages.
Luke et al., "Apparatus, Method and Article for Collection, Charging and Distributing Power Storage Devices, Such As Batteries," U.S. Appl. No. 61/647,936, filed May 16, 2012, 76 pages.
Luke et al., "Apparatus, Method and Article for Redistributing Power Storage Devices, Such As Batteries, Between Collection, Charging and Distribution Machines," U.S. Appl. No. 61/534,753, filed Sep. 14, 2011, 65 pages.
Luke et al., "Dynamically Limiting Vehicle Operation for Best Effort Economy," Office Action for U.S. Appl. No. 13/559,264, dated Aug. 14, 2013, 21 pages.
Luke et al., "Dynamically Limiting Vehicle Operation for Best Effort Economy," Office Action for U.S. Appl. No. 13/559,264, dated Feb. 12, 2014, 24 pages.
Luke et al., "Dynamically Limiting Vehicle Operation for Best Effort Economy," Office Action for U.S. Appl. No. 13/559,264, dated Aug. 19, 2014, 26 pages.
Luke et al., "Dynamically Limiting Vehicle Operation for Best Effort Economy," U.S. Appl. No. 61/511,880, filed Jul. 26, 2011, 52 pages.
Luke et al., "Thermal Management of Components in Electric Motor Drive Vehicles," Office Action dated Apr. 2, 2014, for U.S. Appl. No. 13/559,259, 11 pages.
Luke et al., "Thermal Management of Components in Electric Motor Drive Vehicles," Notice of Allowance dated Jul. 28, 2014, for U.S. Appl. No. 13/559,259, 7 pages.
Luke et al., "Thermal Management of Components in Electric Motor Drive Vehicles," U.S. Appl. No. 61/511,887, filed Jul. 26, 2011, 44 pages.
Luke et al., "Thermal Management of Components in Electric Motor Drive Vehicles," U.S. Appl. No. 61/647,941, filed May 16, 2012, 47 pages.
Luke, "Apparatus, Method and Article for Changing Portable Electrical Power Storage Device Exchange Plans," U.S. Appl. No. 14/204,587, filed Mar. 11, 2014, 56 pages.
Luke, "Apparatus, Method and Article for Changing Portable Electrical Power Storage Device Exchange Plans," U.S. Appl. No. 61/778,038, filed Mar. 12, 2013, 56 pages.
Luke, "Apparatus, Method and Article for Providing Information Regarding a Vehicle Via a Mobile Device," Office Action for U.S. Appl. No. 14/017,081, dated Jan. 30, 2014, 36 pages.
Luke, "Apparatus, Method and Article for Providing Information Regarding a Vehicle Via a Mobile Device," U.S. Appl. No. 14/017,081, filed Sep. 3, 2013, 81 pages.
Luke, "Apparatus, Method and Article for Providing Information Regarding a Vehicle Via a Mobile Device," U.S. Appl. No. 61/780,781, filed Mar. 13, 2013, 80 pages.
Microchip, "AN885: Brushless DC (BLDC) Motor Fundamentals," Microchip Technology Inc., 2003, 19 pages.
Taylor et al., "Apparatus, Method and Article for Physical Security of Power Storage Devices in Vehicles," Notice of Allowance for U.S. Appl. No. 13/559,054, dated May 30, 2013, 32 pages.
Taylor et al., "Apparatus, Method and Article for Physical Security of Power Storage Devices in Vehicles," Office Action for U.S. Appl. No. 13/559,054, dated Dec. 3, 2012, 11 pages.
Taylor et al., "Apparatus, Method and Article for Physical Security of Power Storage Devices in Vehicles," U.S. Appl. No. 14/012,845, filed Aug. 28, 2013, 64 pages.
Taylor et al., "Apparatus, Method and Article for Physical Security of Power Storage Devices in Vehicles," U.S. Appl. No. 61/557,170, filed Nov. 8, 2011, 60 pages.
Taylor et al., "Apparatus, Method and Article for Providing Vehicle Event Data," U.S. Appl. No. 61/901,660, filed Nov. 8, 2013, 58 pages.
Wu et al., "Battery Configuration for an Electric Vehicle," U.S. Appl. No. 61/716,388, filed Oct. 19, 2012, 37 pages.
Wu et al., "Apparatus, Method and Article for a Power Storage Device Compartment," Office Action for U.S. Appl. No. 13/559,125, dated Feb. 24, 2014, 28 pages.
Wu et al., "Apparatus, Method and Article for a Power Storage Device Compartment," U.S. Appl. No. 61/581,566, filed Dec. 29, 2011, 61 pages.
Wu et al., "Apparatus, Method and Article for Providing Information Regarding Availability of Power Storage Devices At a Power Storage Device Collection, Charging and Distribution Machine," U.S. Appl. No. 14/022,140, filed Sep. 9, 2013, 56 pages.
Wu et al., "Apparatus, Method and Article for Providing Information Regarding Availability of Power Storage Devices At a Power Storage Device Collection, Charging and Distribution Machine," Office Action dated Mar. 5, 2014, for U.S. Appl. No. 14/022,140, 8 pages.
Wu et al., "Apparatus, Method and Article for Providing Information Regarding Availability of Power Storage Devices At a Power Storage Device Collection, Charging and Distribution Machine," U.S. Appl. No. 61/601,953, filed Feb. 22, 2012, 53 pages.
Wu et al., "Apparatus, Method and Article for Providing Locations of Power Storage Device Collection, Charging and Distribution Machines," Office Action for U.S. Appl. No. 13/559,333, dated Jul. 3, 2013, 14 pages.

(56) References Cited

OTHER PUBLICATIONS

Wu et al., "Apparatus, Method and Article for Providing Locations of Power Storage Device Collection, Charging and Distribution Machines," Office Action dated Nov. 19, 2013, for U.S. Appl. No. 14/022,147, 10 pages.
Wu et al., "Apparatus, Method and Article for Providing Locations of Power Storage Device Collection, Charging and Distribution Machines," Office Action dated Nov. 27, 2013, for U.S. Appl. No. 13/559,333, 19 pages.
Wu et al., "Apparatus, Method and Article for Providing Locations of Power Storage Device Collection, Charging and Distribution Machines," U.S. Appl. No. 14/022,147, filed Sep. 9, 2013, 56 pages.
Wu et al., "Apparatus, Method and Article for Providing Locations of Power Storage Device Collection, Charging and Distribution Machines," Office Action dated Mar. 5, 2014, for U.S. Appl. No. 14/022,147, 12 pages.
Wu et al., "Apparatus, Method and Article for Providing Locations of Power Storage Device Collection, Charging and Distribution Machines," U.S. Appl. No. 61/601,949, filed Feb. 22, 2012, 56 pages.
Wu et al., "Apparatus, Method and Article for Security of Vehicles," U.S. Appl. No. 61/557,176, filed Nov. 8, 2011, 37 pages.
Wu et al., "Apparatus, Method and Article for Power Storage Device Failure Safety," U.S. Appl. No. 14/071,134, filed Nov. 4, 2013, 68 pages.
Wu et al., "Apparatus, Method and Article for Power Storage Device Failure Safety," Office Action for U.S. Appl. No. 14/071,134, dated Feb. 12, 2014, 14 pages.
Wu et al., "Apparatus, Method and Article for Power Storage Device Failure Safety," Office Action dated Jun. 9, 2014, for U.S. Appl. No. 14/071,134, 15 pages.
Park, "A Comprehensive Thermal Management System Model for Hybrid Electric Vehicles," dissertation, The University of Michigan, 2011, 142 pages.
International Search Report and Written Opinion dated Nov. 18, 2014, for corresponding International Application No. PCT/US2014/050000, 11 pages.
Chinese Office Action dated Jul. 17, 2015, for corresponding CN Application No. 201280047017, with English Translation, 15 pages.
Extended European Search Report dated Aug. 27, 2015, for corresponding EP Application No. 12816881.2-1657, 8 pages.
Extended European Search Report dated Oct. 1, 2015, for corresponding EP Application No. 12818033.8-1807, 9 pages.
Japanese Office Action dated Sep. 1, 2015, for corresponding JP Application No. 2014-523005, with English Translation, 11 pages.
Luke et al., "Dynamically Limiting Vehicle Operation for Best Effort Economy," Preliminary Amendment for U.S. Appl. No. 13/559,264, filed Jun. 24, 2013, 11 pages.
Luke et al., "Dynamically Limiting Vehicle Operation for Best Effort Economy," Office Action for U.S. Appl. No. 13/559,264, dated Jan. 21, 2015, 31 pages.
Luke et al., "Dynamically Limiting Vehicle Operation for Best Effort Economy," Office Action for U.S. Appl. No. 13/559,264, dated Jun. 15, 2015, 36 pages.
Taiwanese Office Action dated Oct. 19, 2015, for corresponding TW Application No. 101127046, with English Translation, 18 pages.
Luke et al., "Dynamically Limiting Vehicle Operation for Best Effort Economy," Notice of Allowance, dated Mar. 28, 2016, for U.S. Appl. No. 13/559,264, 14 pages.
"Road Loads", retrieved from http://www.thecartech.com/subjects/auto_eng/Road_loads.htm on Jun. 4, 2015, 18 pages.
International Search Report and Written Opinion dated Sep. 12, 2016, for corresponding International Application No. PCT/US2016/035889, 10 pages.
Japanese Office Action dated Jun. 7, 2016, for corresponding JP Application No. 2014-523003, with English Translation, 17 pages.
Japanese Office Action dated May 31, 2016, for corresponding JP Application No. 2014-523005, with English Translation, 8 pages.
Kadjik et al., "Road load determination of passenger cars", TNO Report R10237, Oct. 29, 2012, 73 pages.
Taiwanese Office Action dated Aug. 18, 2016, for corresponding TW Application No. 101127046, with English Translation, 24 pages.

\* cited by examiner

ADJUSTING ELECTRIC VEHICLE SYSTEMS BASED ON AN ELECTRICAL ENERGY STORAGE DEVICE THERMAL PROFILE

BACKGROUND

Technical Field

The present disclosure generally relates to vehicles using an electric prime mover or motor powered by at least one rechargeable power cell to provide at least a portion of the motive force needed to propel the vehicle.

Description of the Related Art

Gasoline-electric hybrids and all electric vehicles are becoming increasingly common. Such vehicles may achieve a number of advantages over traditional internal combustion engine vehicles. For example, hybrid or electric vehicles may achieve higher fuel economy and have little or even zero tail pipe emissions. In particular, all electric vehicles may not only have zero tail pipe emissions, but may be associated with reducing the overall pollution in densely populated areas. For example, one or more renewable energy sources (e.g., solar, wind, geothermal, hydroelectric) may provide some or all of the electric power used to charge electric vehicle power cells. Also for example, generation plants that burn relatively "clean burning" fuels (e.g., natural gas) which have higher efficiency than internal combustion engines, and/or which employ pollution control or removal systems (e.g., industrial air scrubbers) which are too large, costly or expensive for use with individual vehicles may provide some or all of the electric power used to charge electric vehicle power cells.

Personal transportation vehicles such as gasoline powered scooters and/or motorbikes are ubiquitous in many places, for example in the densely populated areas found in many large cities of Asia. Such scooters and/or motorbikes tend to be relatively inexpensive to acquire, register, and maintain, particularly when compared to automobiles, cars or trucks. Cities with high numbers of combustion engine scooters and/or motorbikes also tend to suffer from high levels of air pollution leading to reduced air quality for all who live and work in the metropolitan area. When new, many combustion engine scooters and/or motorbikes provide a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified emissions levels are quickly exceeded as the scooters and/or motorbikes age and either not maintained and/or as the scooters and/or motorbikes are modified by owners, for example by intentional or unintentional removal of catalytic converters. Often owners or operators of scooters and/or motorbikes lack the financial resources or the motivation to maintain their vehicles.

Air pollution and the resultant reduction in air quality have a negative effect on human health, being associated with causing or exacerbating various diseases (e.g., numerous reports tie air pollution to emphysema, asthma, pneumonia, and cystic fibrosis, as well as various cardiovascular diseases). Such diseases take large numbers of lives and severely reduce the quality of life of countless others.

BRIEF SUMMARY

The reduced emissions associated with gasoline-electric hybrid vehicles and all-electric vehicles would greatly benefit air quality in densely populated urban areas, and hence tend to improve health of large populations.

Even with the zero tail pipe emissions benefit of all-electric vehicles well understood and their ability to improve the quality of life in large urban areas appreciated, adoption of all-electric vehicles by large populations has been slow. A factor that has hindered a more widespread acceptance and use of hybrid and electric vehicles is the perception that the effective range provided by the electrical energy storage devices carried by the vehicle is limited. Electrical energy storage devices can include any device capable of storing or generating an electrical charge that can provide at least a portion of the power consumed by a vehicular prime mover. Thus, electrical energy storage devices can include batteries such as lead/acid, lithium ion, nickel cadmium, and the like. Electrical energy storage devices can also include capacitive charge storage devices such as supercapacitors or ultracapacitors. Electrical energy storage devices can also include emergent electrochemical technologies, for example fuel cell technologies using membrane or similar technologies using hydrolysis to generate an electric current.

Electrical energy storage devices typically include a number of cells electrically coupled in series and/or parallel to provide a desired storage capacity and delivery voltage. For example, two 12 volt, 50 ampere-hour cells may be connected in series to provide a 24 volt, 50 ampere-hour "stack." Four such stacks may be connected in parallel to provide an electrical energy storage device having a 24 volt output and 200 ampere-hour capacity. While electrical energy storage device manufacturers endeavor to manufacture each cell to a common "standard," inevitable variations between the voltage and capacity of each cell do occur. In such instances, the cells having a relatively low voltage or a relatively low capacity can act as a "weakest link" in the storage device, limiting the useful power delivered by the electrical energy storage device.

Additionally, most electrical energy storage devices rely upon some form of reversible electrochemical reaction to generate current flow under discharge conditions and accept current flow under charge conditions. Many such electrochemical reactions are exothermic, releasing a quantity of thermal energy that is commensurate with or proportionate to the current generated by the electrical energy storage device. To protect electrical energy storage devices against physical damage, theft, and adverse ambient conditions such as the rain that is found in many tropical and sub-tropical environments, the electrical energy storage devices carried by vehicles are often placed in partially or completely enclosed housings. While affording physical and environmental protection, such enclosed housings can trap at least a portion of the thermal energy liberated during the discharge of the electrical energy storage device, causing a rapid and noticeable increase in the internal and/or external temperature of the electrical energy storage device. Such a thermal buildup is exacerbated by high ambient temperature conditions such as those found in many large metropolitan areas.

Performance of an electrical energy storage device may be adversely affected by a variety of conditions, such as current level of charge, temperature and history of use, including age and number of recharging cycles to which the main electrical power storage device has been subjected. Range may also vary based on a variety of other factors or conditions. For example, vehicle related conditions may affect range, for instance size, weight, torque, top speed, drag coefficient. Also for example, driver or operator conditions may affect range, for instance whether and how often the driver or operator drives at high speeds, or accelerates quickly (i.e., jack rabbit starts). As a further example, environmental conditions may affect range, for instance ambient temperatures, and terrain (e.g., flat, hilly).

The power available from an electrical energy storage device typically decreases with temperature. Thus a vehicle powered by an electrical energy storage device and operated in a higher ambient temperature environment will have a range that is less than the same vehicle operated in the same manner using the same electrical energy storage device in a lower ambient temperature environment. Such heating is compounded where the electrical energy storage device contains one or more weakened cells, since such weakened cells typically drain at a greater rate, and consequently produce a greater thermal output byproduct than the surrounding cells. Ensuring adequate and predictable range is an important first step in facilitating widespread acceptance of electrically powered vehicles. This may be particularly true where replacement or replenishment of the main electrical power or energy storage device is possible, assuming the vehicle can reach a location of where such replacement or replenishment is available.

The approaches described herein may address some of the issues which have limited adoption of zero tailpipe emission technology, particularly in densely crowded cities, and in populations with limited financial resources. In particular, the approaches discussed herein address issues related to thermal monitoring of electrical energy storage devices, and adjusting one or more operating parameters of one or more vehicular systems responsive thereto.

For example, some of the approaches described herein may limit vehicle operation (e.g., speed, acceleration) to effectively increase the operating range of the vehicle responsive to an electrical energy storage device thermal profile indicative of reduced charge capacity or power delivery. Additionally, operation of electrically powered vehicle accessories (e.g., air conditioning, heating, defrosting, lighting, audio systems, power windows, power locks, seat heaters, global positioning systems, wireless communication systems, and the like) may be impaired or otherwise limited to effectively increase the operating range of the vehicle responsive to an electrical energy storage device thermal profile indicative of reduced charge capacity or power delivery.

By impairing or limiting the operation of one or more vehicular systems based on the measured thermal profile of the electrical energy storage device powering the vehicle, the operator is provided with the opportunity to use the remaining stored energy to reach a location where electrical energy storage devices are available. In one example, a controller may control operation of one or more power converters to limit current and/or voltage supplied to a traction electric motor of the vehicle or vehicle accessories, as needed to ensure adequate range to reach a site having power available for recharging the onboard electrical energy storage device. In another example, a controller may control operation of one or more power converters to limit current and/or voltage supplied to a traction electric motor of the vehicle or vehicle accessories, as needed to ensure adequate range to reach a site having replacement electrical energy storage devices are available for exchange with the onboard electrical energy storage device.

In at least some instances, reducing the temperature of the electrical energy storage device makes available additional energy to the vehicular prime mover. The additional energy made available by altering the thermal profile of the electrical energy storage device can be allocated or distributed to one or more vehicular systems. Such uses may include, but are not limited to altering the torque/power curve of the prime mover to provide enhanced vehicle performance, enabling one or more onboard systems, and the like.

An electrical energy storage device thermal compensation system may be summarized as including a plurality of thermal sensors, each of the thermal sensors to measure a respective temperature at a location within a vehicular electrical energy storage device; at least one controller, communicably coupled to each of the plurality of thermal sensors, the controller to receive one or more process variable signals from each of the plurality of thermal sensors, each of the process variable signals including data indicative of a temperature sensed by the respective thermal sensor; a controller-readable, machine-executable, instruction set stored in a nontransitory storage medium communicably coupled to the at least one controller, that when executed by the at least one controller, causes the at least one controller to at least: for each of a number of the plurality of thermal sensors, determine a respective sensed temperature; for each of the number of thermal sensors, determine a first difference between the sensed temperature and at least one temperature threshold value logically associated with the respective thermal sensor; responsive at least in part to the determined first difference for each of at least some of the number of thermal sensors, provide at least one control variable signal output at a communications interface; and communicate the at least one control variable signal output to at least one vehicular system, the at least one control variable signal output including at least one parameter to adjust a power consumption of the at least one vehicular system.

The controller-readable, machine-executable, instruction set may include additional instructions that further cause the at least one controller to: stepwise adjust the at least one parameter of the at least one control variable signal output responsive to the determined first difference for each of the number of thermal sensors, wherein each of the stepwise parameter adjustment causes a change in power consumption of the respective vehicular system. The controller-readable, machine-executable, instruction set may include additional instructions that further cause the at least one controller to: measure the power consumption of one or more vehicular systems; assess the criticality of the one or more vehicular systems to user safety and regulatory compliance; assess the criticality of the one or more vehicular systems to remaining vehicle range possible using the existing vehicular electrical energy storage device; assess the criticality of the one or more vehicular system to vehicular performance; identify non-critical vehicular systems; and based at least in part on the determined first difference of at least some of the number of thermal sensors, selectively adjust downward the power consumption of one or more vehicular systems in the following order: identified non-critical vehicular systems; the one or more vehicular systems assessed as critical to vehicular performance; and the one or more vehicular systems assessed as critical to remaining vehicular range. The controller-readable, machine-executable, instruction set may include additional instructions that further cause the at least one controller to: in response to a determined decrease in temperature sensed by one or more thermal sensors, using the at least one control variable signal, selectively adjust upward the power consumption of one or more vehicular systems in the following order: the one or more vehicular systems assessed as critical to remaining vehicular range; the one or more vehicular systems assessed as critical to vehicular performance; and identified non-critical vehicular systems. The controller-readable, machine-executable, instruction set that causes the at least one controller to determine a sensed temperature change over a defined time interval for each of the plurality of thermal sensors, may further cause the at least one controller to: determine an average electrical energy storage device temperature by averaging the sensed temperature of at least two of the plurality of thermal sensors. The controller-readable, machine-executable, instruction set that causes the at least one controller to determine a sensed temperature change over a defined time interval for each of the plurality of thermal sensors, may further cause the at least one controller to: determine a component temperature of an electrical energy storage device component using the sensed temperature provided by at least two of the plurality of thermal sensors. The controller-readable, machine-executable, instruction set may include additional instructions that further cause the at least one controller to: determine a temperature change rate logically associated with each of at least some of the plurality of thermal sensors; and determine a second difference between the determined temperature change rate and one or more defined temperature change rate thresholds logically associated with the respective thermal sensor. The controller-readable, machine-executable, instruction set may include additional instructions that further cause the at least one controller to: stepwise adjust the at least one parameter of the at least one control variable signal output responsive to the determined second difference for at least some of the plurality of thermal sensors, wherein each stepwise parameter adjustment causes a change in power consumption of the respective vehicular system. The controller-readable, machine-executable, instruction set may include additional instructions that further cause the at least one controller to: measure the power consumption of one or more vehicular systems; assess the criticality of the one or more vehicular systems to user safety and regulatory compliance; assess the criticality of the one or more vehicular systems to remaining vehicle range possible using the existing vehicular electrical energy storage device; assess the criticality of the one or more vehicular system to vehicular performance; identify non-critical vehicular systems; and in response to a determined increase in temperature change rate that exceeds one or more defined temperature change rate thresholds, using the at least one control variable signal parameter, selectively adjust downward the power consumption of one or more vehicular systems in the following order: identified non-critical vehicular systems; the one or more vehicular systems assessed as critical to vehicular performance; and the one or more vehicular systems assessed as critical to remaining vehicular range. The controller-readable, machine-executable, instruction set may include additional instructions that further cause the at least one controller to: in response to a determined decrease in temperature change rate that exceeds one or more defined temperature change rate thresholds, using the at least one control variable signal parameter, selectively adjust upward the power consumption of one or more vehicular systems in the following order: the one or more vehicular systems assessed as critical to remaining vehicular range; the one or more vehicular systems assessed as critical to vehicular performance; and identified non-critical vehicular systems. The controller-readable, machine-executable, instruction set may include additional instructions that further cause the at least one controller to: store at least a portion of the data indicative of the determined sensed temperature change over the defined time interval for each of the plurality of thermal sensors in a nontransitory storage media coupled to the vehicular electrical energy storage device. The controller-readable, machine-executable, instruction set may include additional instructions that further cause the at least one controller to: store at least a portion of data indicative of at least one vehicle operating parameters in the nontransitory storage media coupled to the vehicular electrical energy storage device. The controller-readable, machine-executable, instruction set may include additional instructions that further cause the at least one controller to: store at least a portion of data indicative of a determined change in sensed temperature over time (dT/dt) logically associated with the respective thermal sensor in a nontransitory storage media coupled to the vehicular electrical energy storage device. The controller-readable, machine-executable, instruction set may include additional instructions that further cause the at least one controller to: store at least a portion of data indicative of at least one vehicle operating parameters in the nontransitory storage media coupled to the vehicular electrical energy storage device.

An electrical energy storage device thermal compensation system may be summarized as including a plurality of thermal sensors, each of the thermal sensors to measure a respective temperature at a location within a vehicular electrical energy storage device; at least one controller, communicably coupled to each of the plurality of thermal sensors, the controller to receive one or more process variable signals from each of the plurality of thermal sensors, each of the process variable signals including data indicative of a temperature sensed by the respective thermal sensor; a controller-readable, machine-executable, instruction set stored in a nontransitory storage medium communicably coupled to the at least one controller, that when executed by the at least one controller, causes the at least one controller to at least: for each of a number of the plurality of thermal sensors: determine a respective sensed temperature; determine a first difference between the sensed temperature and at least one temperature threshold value logically associated with the respective thermal sensor; determine a respective temperature change rate; determine a second difference between the determined temperature change rate and at least one defined temperature change rate threshold value logically associated with the respective thermal sensor; responsive to the determined first difference for each of at least some of the number of thermal sensors and responsive to the determined second difference for each of at least some of the number of thermal sensors, provide at least one control variable signal output at a communications interface; and communicate the at least one control variable signal output to at least one vehicular system, the at least one control variable signal output including at least one parameter to adjust a power consumption of the at least one vehicular system.

An electrical energy storage device thermal compensation controller may be summarized as including a first signal interface for receipt of a number of process variable signals generated by each of a number of thermal sensors, each of the process variable signals including data indicative of a temperature in respective location in a vehicular electrical energy storage device; a second signal interface for output of a number of control variable signals, each of the control variable signals including at least one parameter to adjust the power consumption of one vehicular system; at least one processor communicably coupled to the first signal interface and the second signal interface; a nontransitory storage media communicably coupled to the at least one processor that includes a processor-readable, machine-executable, instruction set that when executed by the at least one processor, causes the at least one processor to: for each of the number of thermal sensors, determine a respective sensed temperature; for each of the number of thermal sensors, determine a first difference between the sensed temperature and at least one temperature threshold value logically associated with the respective thermal sensor; responsive to the determined first difference for each of at least some of the number of thermal sensors, provide at least one control variable signal output at a communications interface; and communicate the at least one control variable signal output to at least one vehicular system, the at least one control variable signal output including at least one parameter to adjust a power consumption of the at least one vehicular system.

The processor-readable, machine-executable, instruction set may further cause the at least one processor to: determine a temperature change rate for each of at least some of the number of thermal sensors; and determine a second difference between the determined temperature change rate and one or more defined temperature change rate thresholds logically associated with the respective thermal sensor. The controller-readable, machine-executable, instruction set may further cause the at least one controller to: stepwise adjust the at least one parameter of the at least one control variable signal output responsive to the determined first difference for each of at least some of the number of thermal sensors, wherein each of the stepwise parameter adjustment causes a change in power consumption of the respective vehicular system. The controller-readable, machine-executable, instruction set may further cause the at least one controller to: measure the power consumption of the one or more vehicular systems; assess criticality of the one or more vehicular systems to user safety and regulatory compliance; assess criticality of the one or more vehicular systems to remaining vehicle range possible using the existing vehicular electrical energy storage device; assess a criticality of the one or more vehicular system to vehicular performance; identify non-critical vehicular systems; and in response to a determined increase in temperature sensed by one or more thermal sensors, using the at least one control variable signal, selectively adjust downward the power consumption of one or more vehicular systems in the following order: identified non-critical vehicular systems; the one or more vehicular systems assessed as critical to vehicular performance; and the one or more vehicular systems assessed as critical to remaining vehicular range. The controller-readable, machine-executable, instruction set may further cause the at least one controller to: in response to a determined decrease in temperature sensed by one or more thermal sensors, using the at least one control variable signal, selectively adjust upward the power consumption of one or more vehicular systems in the following order: the one or more vehicular systems assessed as critical to remaining vehicular range; the one or more vehicular systems assessed as critical to vehicular performance; and identified non-critical vehicular systems.

An electrical energy storage device thermal compensation method may be summarized as including determining by at least one controller, a sensed temperature for each of a plurality of thermal sensors disposed in a vehicular electrical energy storage device; determining a first difference between the determined sensed temperature for each of a number of the plurality of thermal sensors and at least one temperature threshold value logically associated with the respective thermal sensor; responsive to the determined first difference for each of at least some of the number of thermal sensors, providing at least one control variable signal output at a communications interface; and communicating the at least one control variable signal output to at least one vehicular system, the at least one control variable signal output including at least one parameter to adjust a power consumption of the at least one vehicular system.

The method may further include determining a temperature change rate for each of at least some of the plurality of thermal sensors; and determining a second difference between the determined temperature change rate and one or more defined temperature change rate thresholds logically associated with the respective thermal sensor. The method may further include stepwise adjusting the at least one parameter of the at least one control variable signal output responsive to the determined difference for each of at least some of the number of thermal sensors, wherein each stepwise parameter adjustment causes a change in power consumption of the respective vehicular system. The method may further include measuring the power consumption of the one or more vehicular systems; assessing criticality of the one or more vehicular systems to user safety and regulatory compliance; assessing criticality of the one or more vehicular systems to remaining vehicle range possible using the existing vehicular electrical energy storage device; assessing criticality of the one or more vehicular system to vehicular performance; identifying non-critical vehicular systems; and in response to a determined increase in temperature sensed by each of at least some of the number of thermal sensors, using the at least one control variable signal, selectively adjusting downward the power consumption of one or more vehicular systems in the following order: identified non-critical vehicular systems; the one or more vehicular systems assessed as critical to vehicular performance; and the one or more vehicular systems assessed as critical to remaining vehicular range. The power cell thermal compensation method may further include in response to a determined decrease in temperature sensed by each of at least some of the number of thermal sensors, using the at least one control variable signal, selectively adjusting upward the power consumption of one or more vehicular systems in the following order: the one or more vehicular systems assessed as critical to remaining vehicular range; the one or more vehicular systems assessed as critical to vehicular performance; and identified non-critical vehicular systems.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, super- or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device or electrical energy storage device means any device capable of storing electrical power and releasing stored electrical power including, but not limited to, batteries, super- or ultracapacitors. Reference to batteries means a chemical storage cell or cells, for instance rechargeable or secondary battery cells including, but not limited to, nickel cadmium alloy or lithium ion battery cells.

The headings and Abstract of the Disclosure provided herein are for convenience only and do not interpret the scope or meaning of the embodiments.

Figure 1:
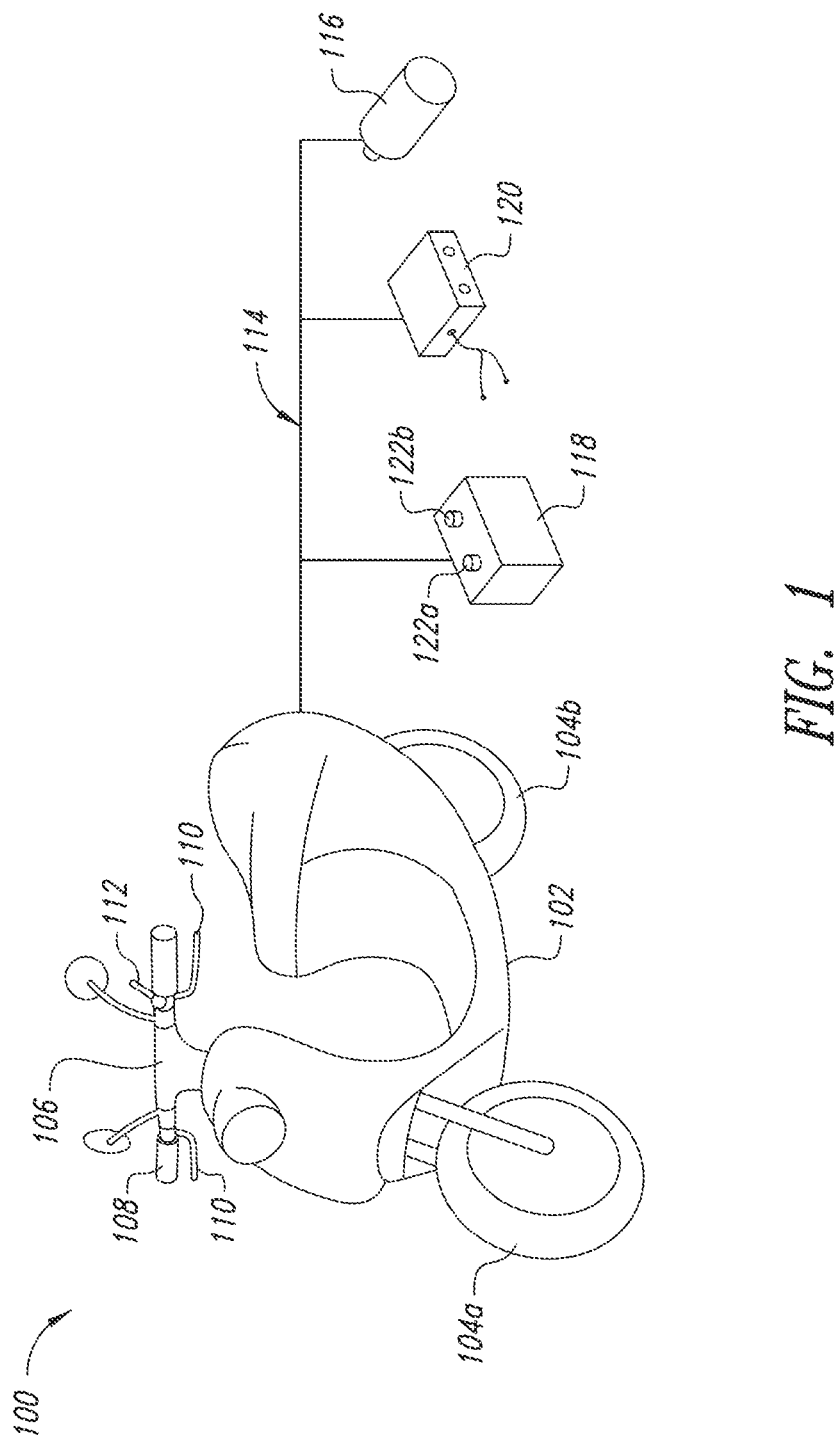
FIG. 1 is an isometric, partially exploded, view of an electric vehicle that includes some or all of the various components or structures described herein, according to one non-limiting illustrated embodiment.

FIG. 1 shows an electric vehicle 100. In at least some implementations, the electric vehicle 100 can include a vehicle that is partially powered using stored electric energy (e.g., a gasoline/electric hybrid vehicle). In at least some implementations, the electric vehicle 100 can include a personal transportation vehicle such as the electric scooter shown in FIG. 1.

As previously noted, combustion engine scooters and motorbikes are common in many large cities, for example in Asia, Europe and the Middle East. The ability to address performance or efficiency issues related to the use of electrical energy storage devices (e.g., secondary batteries) as the main or primary energy source for a vehicle may foster the use of all-electric scooters and motorbikes 108 in place of internal combustion engine scooters and motorbikes, thereby alleviating air pollution, as well as reducing noise.

The electric vehicle 100 includes a frame 102, wheels 104a, 104b (collectively 104), and handle bar 106 with user controls such as throttle 108, brake levers 110, turn indicators switches 112, etc., all of which may be of conventional design. The electric vehicle 100 may also include a power system 114, which includes a traction electric motor 116 coupled to drive at least one of the wheels 104b, at least one electrical energy storage device 118 that stores electrical energy to power at least the traction electric motor 116, and control circuit 120 which controls the allocation of energy between at least the electrical energy storage device 118 and the traction electric motor 116.

The traction electric motor 116 may take any of a variety of forms, but typically will be a permanent magnet induction motor capable of producing sufficient power (Watts or horsepower) and torque to drive the expected load at desirable speeds and acceleration. The traction electric motor 116 may be any conventional electric motor capable of operating in a drive mode, as well as operating in a regenerative braking mode. In the drive mode, the traction electric motor consumes electrical energy, to drive the wheel. In the regenerative braking mode, the traction electric motor operates as a generator, producing electric current in response to rotation of the wheel and producing a braking effect to slow a vehicle.

The electrical energy storage device(s) 118 powering the electric vehicle 100 may take a variety of forms, for example one or more batteries (e.g., array of battery cells); one or more super-capacitors (e.g., array of super-capacitor cells); one or more ultracapacitors (e.g., array of ultracapacitor cells), or the like. For example, the electrical energy storage devices 118 may take the form of rechargeable batteries (i.e., secondary cells or batteries). Rechargeable batteries may include any current or future developed energy storage device including, but not limited to, lead/acid storage cells, nickel/cadmium storage cells, lithium ion storage cells, thin film lithium storage cells, nickel/metal hydride storage cells, and the like. In at least some implementations, the electrical energy storage devices 118 may be sized to physically fit, and electrically power, personal transportation vehicles 100, such as scooters or motorbikes, and may be portable to allow easy replacement or exchange. Given the likely demand imposed by the transportation application, the electrical energy storage devices 118 are likely to take the form of one or more chemical battery cells.

The electrical energy storage devices 118 may include a number of electrical lugs, contacts, and/or terminals 122a, 122b (two illustrated, collectively "terminals 122"), accessible from an exterior of the electrical energy storage device 118. The terminals 122 allow charge to be delivered from the electrical energy storage device 118, as well as allow charge to be delivered to the electrical energy storage device 118 for charging or recharging the same. While illustrated in FIG. 1 as posts, the terminals 122 may take any other form accessible from an exterior of the electrical energy storage device 118, including terminals 122 positioned within slots in a battery housing. In at least some implementations, the terminals 122 may be disposed in recesses such as cups or slots within the exterior of the electrical energy storage device 118 to reduce the likelihood of an accidental shorting of the electrical terminals 122 during handling.

As better illustrated and described below, the control circuit 120 includes various components for transforming, conditioning and controlling the flow of electrical energy in the various systems found on-board the vehicle 100. In particular, the control circuit 120 can control the flow of energy between the electrical energy storage device 118 and the traction electric motor 116. In at least some implementations, the control circuit 120 can monitor one or more electrical energy storage device 118 parameters (voltage, current, temperature, charge level, cycles, temperature, etc.) and alter, adjust, or control the distribution of energy from the one or more electrical energy storage devices 118 to various vehicular systems. The control circuit 120 can perform such energy distribution in a defined manner that is responsive to the one or more electrical energy storage device parameters.

Figure 2:
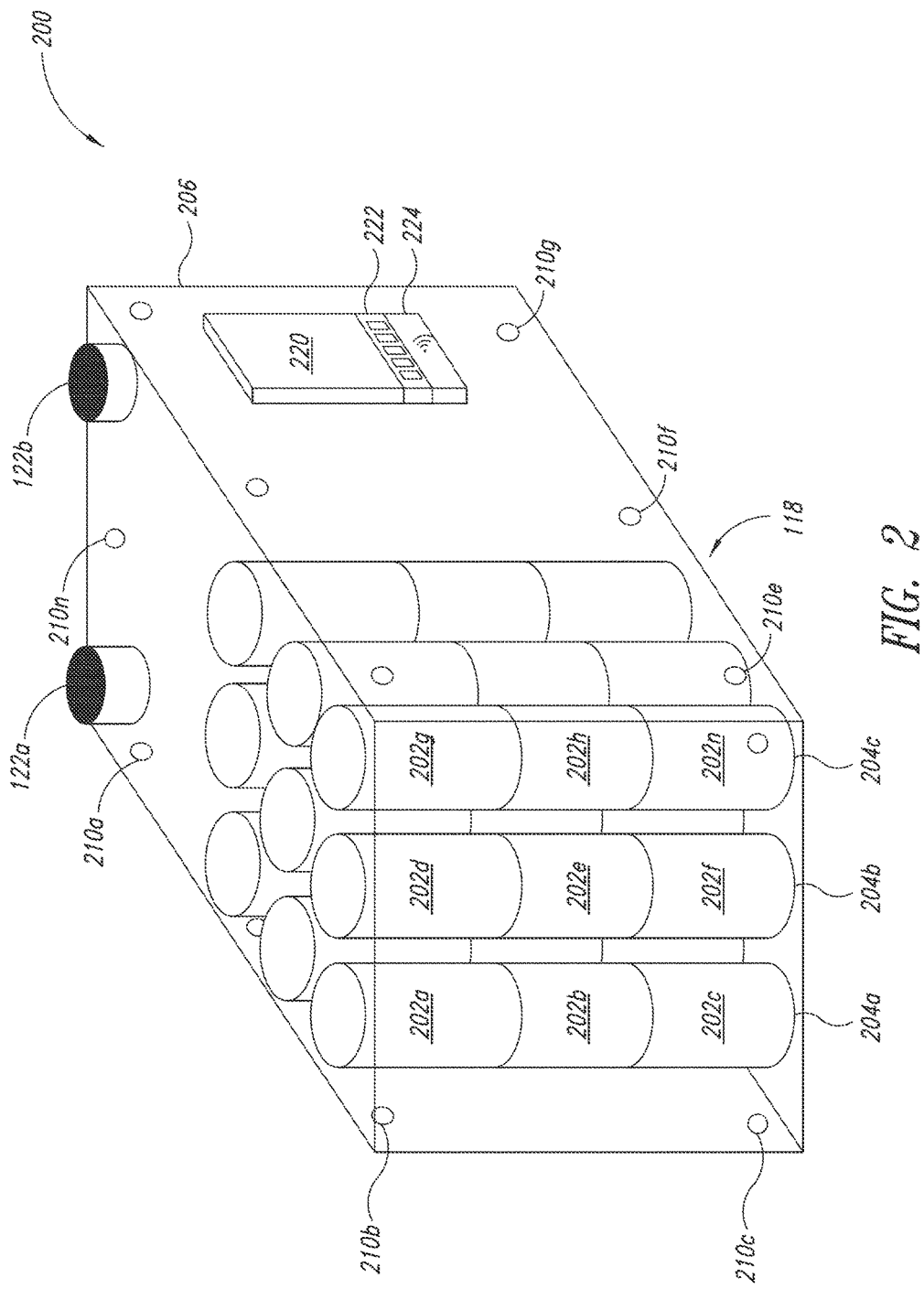
FIG. 2 is an isometric view of an example electrical energy storage device equipped with a number of thermal sensors that is suitable for use as a power source in an electric vehicle in a manner described herein, according to one non-limiting embodiment.

FIG. 2 shows an example electrical energy storage device 118. The electrical energy storage device 118 can include any number of individual energy storage cells 202a-202n (collectively "storage cells 202") arranged in electrical series or parallel to provide a desired voltage and/or energy storage capacity. For example, three (3) "AA" size 3.6-volt rechargeable storage cells 202a-202c electrically coupled in series can form a 10.8-volt storage cell stack 204a. Any number of such storage cell stacks 204a-204n (collectively "storage cell stacks 204") may be electrically coupled in parallel and sealed within a housing 206 to form an electrical energy storage device 118 having a defined energy storage capacity. For example, if each of the 3.6-volt rechargeable storage cells 202 in the above example are rated for 5,000 milliamp-hours (mAh), and thirty (30) such storage cell stacks 204 are connected in parallel to form the electrical energy storage device 118, the electrical energy storage device 118 would have a rating of about 10.8-volts and about 150,000 mAh.

Thus, each electrical energy storage device 118 can include tens or even hundreds of individual storage cells 202 electrically coupled to the terminals 122. While manufactured to defined physical and electrical specifications, variations in each storage cell 202 may occur during manufacturing or subsequent use or handling of the electrical energy storage device 118. Such may include variations in cell discharge voltage, storage capacity, and the like. Compromised storage cells 202 having reduced storage capacity or discharge voltage tend to produce higher discharge currents and greater thermal output than storage cells 202 having a normal discharge voltage and storage capacity. When buried within an electrical energy storage device 118, a significant portion of the thermal energy released by such compromised storage cells 202 fails to dissipate via transfer to the housing 206 and/or the external environment and remains trapped within the electrical energy storage device. Such a heat buildup is often not perceptible to a casual user of the device and therefore goes unnoticed until the electrical energy storage device 118 fails. In some instances, such failures rupture housing 206.

The energy released by the electrical energy storage device 118 is a function of numerous variables, including the temperature of the electrical energy storage device 118. The temperature of the electrical energy storage device 118 is dependent upon both the ambient temperature in which the electrical energy storage device is used as well as the thermal energy released when the electrical energy storage device 118 operates. Generally, the greater the electrical load placed on the electrical energy storage device 118, the greater and generally the more rapid the temperature increase of the electrical energy storage device. Weakened or compromised storage cells 202 will discharge at a rate higher than other non-weakened or non-compromised storage cells 202. Such rapid discharge of compromised storage cells 202 can cause localized heat buildup within the electrical energy storage device 118.

The ability to monitor thermal conditions throughout the electrical energy storage device 118 therefore can provide important insight into the performance of the electrical energy storage device 118 and the remaining life expectancy of the electrical energy storage device 118. In at least some instances, logically relating the thermal performance of the electrical energy storage device 118 to the operating conditions experienced by the electrical energy storage device 118 can provide important information on conditions having the greatest impact on the electrical energy storage device 118.

Any number of thermal sensors 210a-210n (collectively "thermal sensors 210") can be positioned or otherwise disposed in, on, and about the electrical energy storage device 118. In some instances, thermal sensors 210 internal to the electrical energy storage device 118 can measure power cell temperatures unobtainable using only externally mounted thermal sensors 210. In some instances, thermal sensors 210 positioned proximate the electrical energy storage device housing 206 can measure the temperature of the case or housing 206 enclosing of the electrical energy storage device 118. The thermal sensors 210 can include one or more contact thermal sensors, non-contact thermal sensors, or combination thereof. The thermal sensors 210 can include any current or future developed device able to provide a detectable signal output indicative or representative of the temperature of the thermal sensor 210. Such thermal sensors 210 can include thermocouples, resistive thermal devices ("RTD"), thermistors, silicon-based sensors, or combinations thereof. In some instances, some or all of the thermal sensors 210 present in an electrical energy storage device 118 can be wiredly or wirelessly communicably coupled to each other and/or to an external device, for example the control circuit 120. The thermal sensors 210 can be disposed or otherwise positioned in the electrical energy storage device 118 to measure the temperature of various locations, points, zones, or regions in the electrical energy storage device 118.

In at least some instances, one or more nontransitory storage devices 220 are physically and communicably coupled to the electrical energy storage device 118. The one or more nontransitory storage devices 220 can include persistent memory, non-persistent memory, or any combination thereof. In at least some instances, temperature information provided by some or all of the thermal sensors 210 can be stored or otherwise retained in the persistent memory portion of such nontransitory storage devices 118. In at least some instances, the electrical energy storage device 118 can supply all or a portion of the power consumed by some or all of the thermal sensors 210 and the nontransitory storage devices 220.

In at least some instances, one or more communications interfaces may be communicably coupled to the nontransitory storage device 220. In some instances, the nontransitory storage device 220 can include a wired communications interface 222. In some instances, the nontransitory storage device 220 can include a wireless communications interface 224. The communications interface can permit the unidirectional or bidirectional exchange of data between the nontransitory storage device 220 and one or more external devices such as the control circuit 120. In some instances, the nontransitory storage device 220 can receive via the communications interface data indicative of one or more vehicular operating parameters. Such data may include information on throttle position, location, braking, cornering, acceleration, supplemental and/or auxiliary system use, and the like. In at least some instances, the output of one or more thermal devices 210 may be logically associated with the vehicular operating parameter data stored in the nontransitory storage device 220. Such logical associations between vehicular operating parameter data and electrical energy storage device thermal data can be analyzed and used to identify weakened and/or compromised power cells 202, power cell stacks 204, and/or electrical energy storage devices 118.

Figure 3:
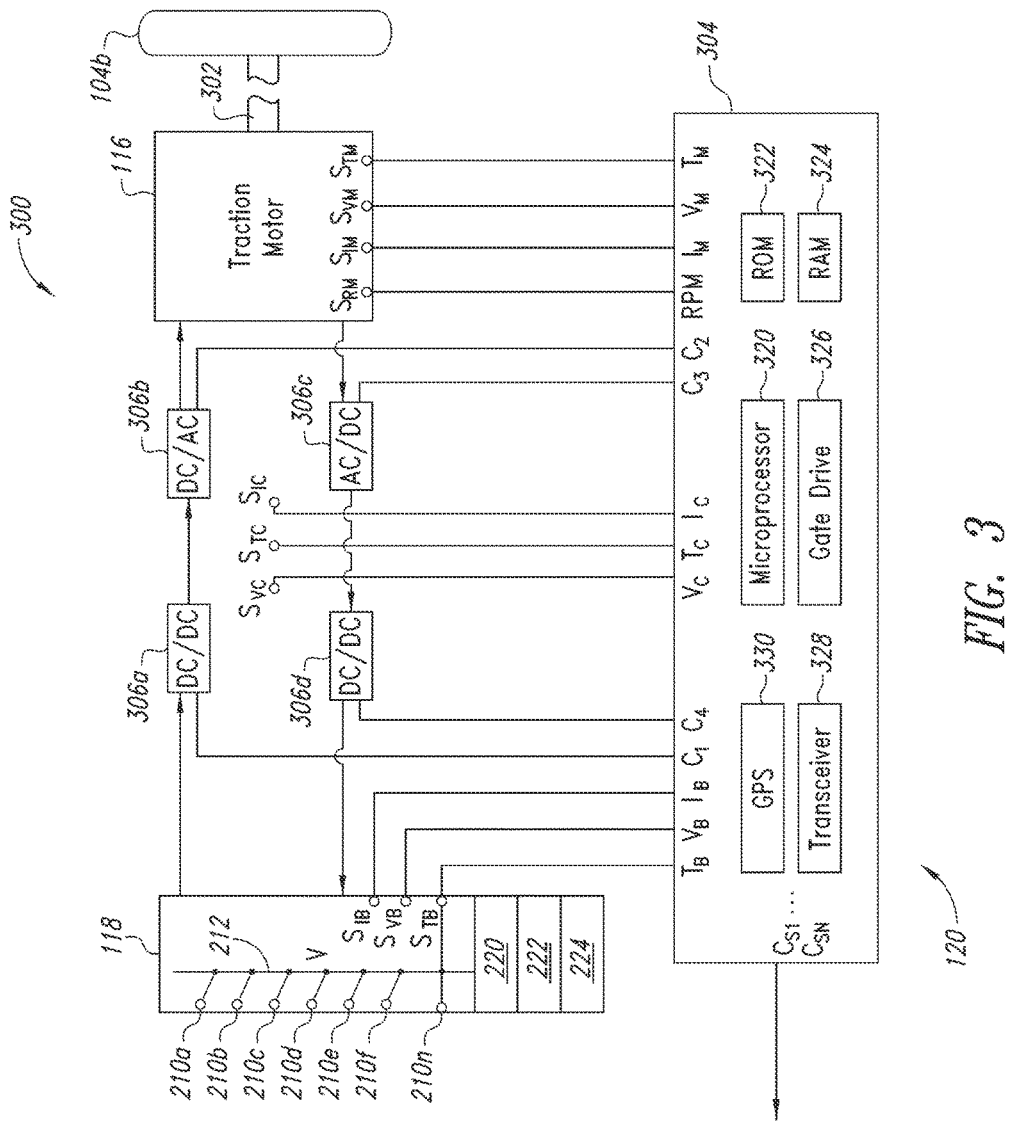
FIG. 3 is a block diagram of some of the components or structures of the vehicle of FIG. 1, according to one non-limiting illustrated embodiment.

FIG. 3 shows the portions of the electric vehicle 100, according to one illustrated embodiment. In particular, FIG. 3 shows an embodiment that employs a number of thermal sensors 210 disposed within the electrical energy storage device 118 to provide data indicative of thermal conditions within the electrical energy storage device 118 to the control circuit 120. In response to the receipt of data indicative of thermal conditions within the electrical energy storage device 118, the control circuit can adjust the power delivery and/or distribution between vehicular systems to alter, adjust, or control the thermal conditions within the electrical energy storage device 118, thereby maximizing the available charge remaining in the electrical energy storage device 118.

As illustrated, the traction motor 116 includes a shaft 304, which is coupled either directly or indirectly to drive at least one wheel 104b of the electric vehicle 100. While not illustrated, a transmission (e.g., chain, gears, universal joint) may couple the traction motor 116 to the wheel 104b.

The control circuit 120 may take any of a large variety of forms, and will typically include a controller 304, one or more power converters 306a-306d (four illustrated), and/or sensors $S_{TB}$, $S_{VB}$, $S_{IB}$, $S_{TC}$, $S_{VC}$, $S_{IC}$, $S_{TM}$, $S_{VM}$, $S_{IM}$, $S_{RM}$.

As illustrated in FIG. 3, the control circuit 120 may include a first DC/DC power converter 306a that in a drive mode or configuration supplies energy from the electrical energy storage device 118 to the traction motor 116. The first DC/DC power converter 306a may step up a voltage of electrical energy from the electrical energy storage device 118 to a level sufficient to drive the traction motor 116. The first DC/DC power converter 306a may take a variety of forms, for example an unregulated or a regulated switch mode power converter, which may or may not be isolated. For instance, the first DC/DC power converter 306a may take the form of a regulated boost switch mode power converter, or buck-boost switch mode power converter.

The control circuit 120 may include a DC/AC power converter 306b, commonly referred to as an inverter that in the drive mode or configuration supplies energy from the electrical energy storage device 118 to the traction motor 116 via the first DC/DC converter 306a. The DC/AC power converter 306b may invert electrical power from the first DC/DC converter 206a into an AC waveform suitable to drive the traction electric motor 116. The AC waveform may be single phase or multi-phase, for example two or three phase AC power. The DC/AC power converter 306b may take a variety of forms, for example an unregulated or a regulated switch mode power converter, which may or may not be isolated. For instance, the DC/AC power converter 306b may take the form of a regulated inverter.

Control signals $C_1$, $C_2$ supplied by the controller 304 control one or more operational aspects of the first DC/DC power converter 306a and the DC/AC power converter 306b, respectively. For example, the controller 304, or some intermediary gate drive circuitry, may supply pulse width modulated gate drive signals to control operation of switches (e.g., metal oxide semiconductor field effect transistors or MOSFETs, bipolar insulated gate transistors or IGBTs) of the first DC/DC and/or DC/AC power converters 306a, 306b.

As further illustrated in FIG. 3, the control circuit 120 may include an AC/DC power converter 306c, commonly referred to as a rectifier that in braking or regenerative braking mode or configuration couples the traction motor 116 to supply power generated thereby to the electrical energy storage device 118. The AC/DC power converter 306c may rectify an alternating current waveform produced by the traction electric motor 116 to a direct current suitable for charging at least the electrical energy storage device 118. The AC/DC power converter 306c may take a variety of forms, for example a full bridge passive diode rectifier or a full bridge active transistor rectifier.

The control circuit 120 may also include a second DC/DC power converter 306d that electrically couples the traction electric motor 116 to the electrical energy storage device 118 via the AC/DC power converter 306c. The second DC/DC power converter 306d may step down a voltage of the electrical power generated by the traction electric motor 116 to a level suitable for the electrical energy storage device 118. The second DC/DC power converter 306d may take a variety of forms, for example an unregulated or regulated switch mode power converter, which may or may not be isolated. For instance, the second DC/DC power converter 306d may take the form of a regulated buck switch mode power converter, synchronous buck switch mode power converter, or buck-boost switch mode power converter.

The AC/DC power converter 306c and the second DC/DC power converter 306d are controlled via control signals $C_3$, $C_4$, respectively, supplied via the controller 304. For example, the controller 304, or some intermediary gate drive controller, may supply pulse width modulated gate drive signals to control operation of switches (e.g., MOSFETs, IGBTs) of the AC/DC and/or the second DC/DC power converters 306c, 306d.

The controller 304 may take a variety of forms that may include one or more integrated circuits, integrated circuit components, analog circuits or analog circuit components. As illustrated the controller 304 includes a microcontroller 320, non-transitory computer- or processor readable memory such as a read only memory (ROM) 322 and/or random access memory (RAM) 324, and may optionally include one or more gate drive circuits 326.

The microcontroller 320 executes one or more machine executable instruction sets or logic to alter, adjust, or control one or more operational aspects of the power system, and may take a variety of forms. For example, the microcontroller 320 may take the form of a microprocessor, programmed logic controller (PLC), programmable gate array (PGA) such as a field programmable gate array (FPGS), and application specific integrated circuit (ASIC), or other such microcontroller device. The ROM 322 may take any of a variety of forms capable of storing processor executable instructions and/or data to implement the control logic. The RAM 324 may take any of a variety of forms capable of temporarily retaining processor executable instructions or data. The microcontroller 320, ROM 222, RAM 324 and optionally gate drive circuit(s) 326 may be coupled by one or more buses (not shown), including power buses, instructions buses, data buses, address buses, etc. Alternatively, the control logic may be implemented in an analog circuit.

The gate drive circuit(s) 326 may take any of a variety of forms suitable for driving switches (e.g., MOSFETs, IGBTs) of the power converters 306 via drive signals (e.g., PWM gate drive signals). While illustrated as part of the controller 304, one or more gate drive circuits may be intermediate the controller 304 and the power converters 306.

The controller 304 may receive process variable signals $S_{TB}$, $S_{VB}$, $S_{IB}$, $S_{TC}$, $S_{VC}$, $S_{IC}$, $S_{TM}$, $S_{VM}$, $S_{IM}$, $S_{RM}$ from one or more sensors. The controller 304, via one or more sets of control logic, may use data included in at least some of the signals as process variable input(s) useful for generating one or more control variable signal output(s) $C_{S1}$-$C_{SN}$. Such control variable signal output(s) $C_{S1}$-$C_{SN}$ may be useful for controlling the energy consumption, energy distribution, and/or energy allocation to one or more vehicular systems. For example, responsive to the receipt of a process variable signal $S_{TB}$ indicative of an electrical energy storage device temperature in excess of one or more defined threshold values, the controller 304 may generate one or more control variable signal output(s) $C_{S1}$-$C_{SN}$ to alter, adjust, control, or limit the energy allocated to one or more vehicular systems. By reducing the energy demand placed on the electrical energy storage device 118 by the vehicular systems, the temperature of the electrical energy storage device 118 can be reduced. By reducing the temperature of the electrical energy storage device 118, the energy available stored in the electrical energy storage device that is available to the vehicular systems can be increased.

In at least some instances, the process variable signal $S_{TB}$ may include data indicative of temperatures gathered by any number of thermal sensors 210 in, on, or about the electrical energy storage device 118. For example, data indicative of temperatures gathered using thermal sensors 210a-210n may be wiredly or wirelessly communicated to the controller 304 via the process variable signal $S_{TB}$.

An electrical energy storage device voltage sensor positioned to sense a voltage across the electrical energy storage device 118 can generate and transmit a process variable signal $S_{VB}$ that includes data indicative of the voltage sensed at the electrical energy storage device 118.

An electrical energy storage device current sensor positioned to sense a current at the electrical energy storage device 118 can generate and transmit a process variable signal $S_{IB}$ that includes data indicative of the current sensed at the electrical energy storage device 118.

A power converter temperature sensor positioned to sense a temperature of one or more of the power converter(s) 306 or the ambient environment proximate the power converter(s) 306 can generate and transmit the process variable signal $S_{TC}$ that includes data indicative of the respective sensed temperature at the one or more power converter(s) 306.

A power converter voltage sensor positioned to sense a voltage across one or more of the power converters 306 can generate and transmit the process variable signal $S_{VC}$ that includes data indicative of the sensed voltage at the one or more power converter(s) 306.

A power converter current sensor positioned to sense a current at the one or more of the power converter(s) 306 can generate and transmit the process variable signal $S_{IC}$ that includes data indicative of the sensed charge at the one or more power converter(s) 306.

A traction motor temperature sensor positioned to sense a temperature of the traction electric motor 116 or ambient environment proximate the traction motor 116 can generate and transmit the process variable signal $S_{TM}$ that includes data indicative of the sensed temperature at the traction motor 116.

A traction motor voltage sensor positioned to sense a voltage across the traction motor 116 can generate and transmit the process variable signal $S_{VM}$ that includes data indicative of the sensed voltage at the traction motor 116.

A traction motor current sensor positioned to sense a current flow through the traction motor 116 can generate and transmit the process variable signal $S_{IM}$ that includes data indicative of the sensed current at the traction motor 116.

A traction motor rotational sensor positioned to sense a rotation speed of the traction motor 116 can generate and transmit the process variable signal $S_{RM}$ that includes data indicative of the sensed rotational speed (e.g., in revolutions per minute or "RPM") of the traction motor 116.

As discussed herein, the controller 304 can use data provided by one or more of the process variable signals $S_{TB}$, $S_{VB}$, $S_{IB}$, $S_{TC}$, $S_{VC}$, $S_{IC}$, $S_{TM}$, $S_{VM}$, $S_{IM}$, $S_{RM}$ to control one or more operational aspects of one or more vehicular systems. In particular, responsive to a detected or sensed change in the electrical energy storage device temperature process variable signal that exceeds one or more defined threshold values, the controller 304 can alter, adjust or control a power consumption operational aspect of one or more vehicular systems.

For example, responsive to the receipt of data indicative of an increase in electrical energy storage device temperature, the controller 304 can generate one or more control variable output signals to reduce an operational aspect such as the power consumption of one or more vehicular systems. In some instances, such reduction in the power consumption operational aspect may be in the form of a limitation on the energy made available to the particular vehicular system. In some instances, such energy limitations and/or changes in power allocation may be in the form of a step change in which the energy made available to and/or the power consumption of the vehicular system is reduced in discrete steps dependent upon the magnitude of the deviation between the sensed electrical energy storage device temperature and one or more defined threshold values. By reducing the energy made available to and/or the power consumption of one or more vehicular systems, the load on the electrical energy storage device is decreased and consequently, the temperature of the electrical energy storage device will decrease.

In another example, responsive to the receipt of data indicative of a decrease in electrical energy storage device temperature, the controller 304 may generate one or more control variable output signals to increase the energy allocation to and/or power consumption operational aspect of one or more vehicular systems. In some instances, such an increase in the energy allocation and/or power consumption operational aspect may be in the form of a step change in which the energy made available to and/or the power consumption of the vehicular system is increased in discrete steps dependent upon the magnitude of the deviation between the sensed electrical energy storage device temperature and one or more defined threshold values. By increasing the power consumption of one or more vehicular systems, the load on the electrical energy storage device is increased and the temperature of the electrical energy storage device will increase.

The controller 304 includes either a transmitter and receiver or a transceiver 328. In at least some instances, the transceiver 328 may provide wired and/or wireless communications with components, systems, or devices that are remote from the scooter 100. The transceiver 328 may take a large variety of forms suitable to provide wired or wireless communications. For example, the transceiver 328 may take the form of a cellular phone chipset (also referred as a radio) and antenna(s) to carry on communications with a remote system via a cellular service provider network. The transceiver 328 may implement wireless communications approaches other than cellular based communications. Communications may include receiving information and/or instructions from a remote system or device, as well as transmitting information and/or instructions or queries to a remote system or device.

In at least some instances, the transceiver 328 may include one or more devices capable of communicably coupling with a cellular communications device (e.g., a cell phone or smartphone) carried by a user. Examples of such devices include, but are not limited to any current or future developed radio frequency communications devices such as Bluetooth® devices, near field communications (NFC) devices, and the like. In at least some instances, the transceiver 328 can communicably couple to one or more external systems or devices via a Bluetooth or NFC connection to a cellular device carried by the user.

The controller 304 may include a global positioning system (GPS) receiver 330, which receives signals from GPS satellites allowing the controller 304 to determine a current location of the scooter 100. In at least some implementations, the GPS receiver 330 may include a GPS chipset without provision of a user display on the scooter 100. Any of a large variety of commercially available GPS receivers may be employed. The present location or position may be specified in coordinates, for example a longitude and latitude that is accurate to within 3 meters. Alternatively, other techniques may be employed for determining the present location or position of the scooter 100, for example triangulation based on three or more cellular towers or base stations.

Elevation at a present location may be discernible or determined based on the GPS coordinates. Likewise, elevation changes between a current location and one or more other locations or destinations may be determined using a topographical mapping or other structured format that relates GPS coordinates with elevations. Such may be advantageously employed in better estimating a range of the scooter 100. Alternatively, or additionally, the scooter 100 may include an altimeter that detects elevation, or other sensors, for example an accelerometer, that detects changes in elevation. Such may allow potential energy associated with a relative position of the scooter 100 with respect to hills (e.g., top of hill, bottom of hill) to be taken into account when determining an estimate range. Such may advantageously produce more accurate or estimated range, preventing unnecessary limiting of operational performance. For example, knowledge that the scooter 100 is at or proximate a top of a large hill may lead to an increase in the determined estimated range, bringing a replacement or replenishment location within the range, and preventing the need to limit operational performance. Alternatively, knowledge that the scooter 100 is at or proximate a bottom of a large hill may lead to a decrease in the determined estimated range, indicating that a nearest replacement or replenishment location is outside the estimated range, and causing the limiting of operational performance to occur earlier than otherwise, ensuring that the scooter 100 will reach the replacement or replenishment location.

Figure 4:
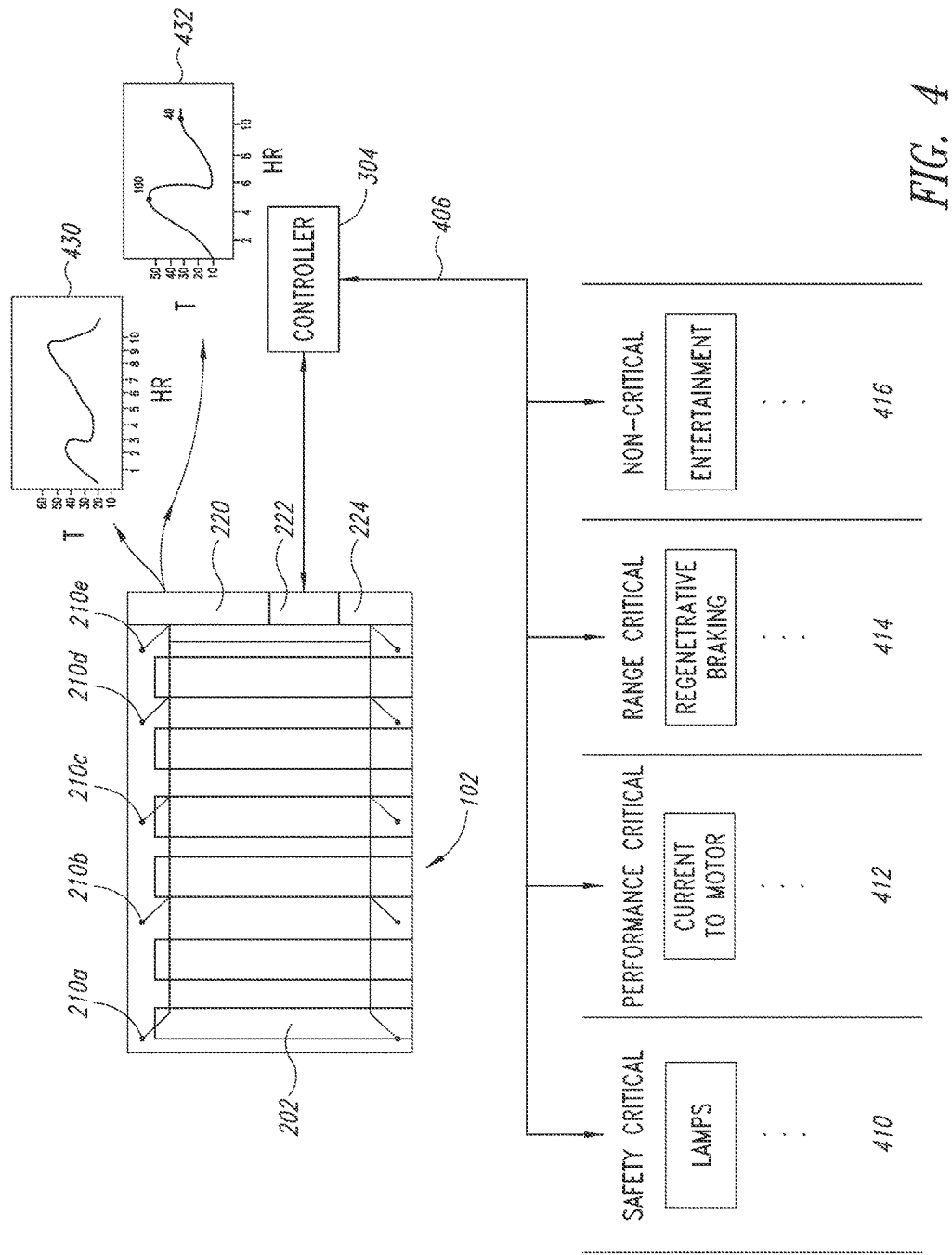
FIG. 4 is another block diagram of some of the components or structures of the vehicle of FIG. 1, according to one non-limiting illustrated embodiment.

FIG. 4 shows a block diagram of a scooter controller 304 receiving process variable signals including data indicative of electrical energy storage device 118 temperatures from a number of thermal sensors 210. FIG. 4 also shows control variable output signals 406 generated by the controller 304 and transmitted to one or more vehicular systems. The vehicular systems can include one or more safety critical systems 410, one or more performance critical systems 412, one or more range critical systems 414, and one or more non-critical systems 416.

The controller 304 can execute one or more sets of machine executable instructions that cause the generation of one or more control variable outputs 406 in response to one or more process variable inputs received by the controller 304. In at least some instances, the control variable outputs 406 can change the power consumption of one or more vehicular systems 410, 412, 414, and/or 416. Such power consumption adjustments may in some instances be performed by the controller 304 to maintain one or more temperatures in the electrical energy storage device 118 within a desired operating range that maximizes the available range of the electrical energy storage device 118.

The demands placed by each vehicular system 410, 412, 414, and/or 416 on the electrical energy storage device 118 are cumulative. Since the temperature of the electrical energy storage device 118 is to a large extent dependent upon the temperature of the electrical energy storage device 318, an optimal temperature range exists at which the power delivered by the electrical energy storage device 118 is maximized. The controller 304 can control the temperature of the electrical energy storage device 118 by changing the demand placed on the electrical energy storage device 118 by the vehicular systems. In at least some implementations, the controller 304 can adjust upward or downward the power consumption of one or more vehicular systems in a series of step changes to cause a corresponding upward or downward change in temperature in the electrical energy storage device 118. In such a manner, the controller 304 can compensate for various conditions internal and external to the electrical energy storage device 118 to maintain the temperature of the electrical energy storage device 118 within a defined preferred temperature range providing the greatest possible energy stored within the electrical energy storage device 118.

In at least some instances, the controller 304 can alter, control, adjust, or change the energy supplied by the electrical energy storage device 118 to one or more vehicular systems based at least in part on an assessment of whether the vehicular system is a safety critical system 410, performance critical system 412, range critical system 414, and/or non-critical system 416. For example, in response to a detected increase in electrical energy storage device temperature the controller 304 can downwardly adjust the power consumption of vehicle systems in the following order: first, non-critical systems 416; second, performance critical systems 412; third, range critical systems 414; and finally, safety critical systems 410. In another example, in response to a detected decrease in electrical energy storage device 118 temperature, the controller 304 can upwardly adjust the power consumption of vehicle systems in the following order: first, safety critical systems 410; second, range critical systems 414; third, performance critical systems 412; and finally, non-critical systems 416.

Safety critical systems 410 can include, but are not limited to, any vehicular systems related to the safety of the vehicle user or occupants and any vehicular systems required for compliance with local, regional, or federal regulations. Examples of such systems would include, but are not limited to: turn signals, headlamp, tail lamp, braking, license illumination lamp, and the like.

Performance critical systems 412 can include, but are not limited to, any vehicular systems related to the torque and/or acceleration of the vehicle. Performance critical systems can also include systems used in steering, braking, and starting the vehicle.

Range critical systems 414 can include, but are not limited to, any vehicular systems related to extending or otherwise optimizing the range of the vehicle on the available charge remaining in the electrical energy storage device 118. Examples of such systems would include: regenerative braking systems, and power converters used to provide charging current to the electrical energy storage device 118.

Non-critical systems 416 can include, but are not limited to any vehicular systems that are not classifiable in one of the three other systems. Examples of such systems can include, but are not limited to: entertainment systems, non-regulatory lighting, and the like.

In at least some instances, the assessment of whether a particular system is safety critical, performance critical, range critical or non-critical may be in the form of a situational assessment performed by the controller 304. For example, during daylight hours a headlamp the situational assessment by the controller 304 may determine the headlamp is not needed and therefore non-critical; however, at night or in reduced visibility conditions the headlamp is necessary for user safety or regulatory compliance. Similarly, when environmental precipitation is present the situational assessment by the controller 304 may determine a windshield wiper is safety critical, however when environmental precipitation is not present, the windshield wiper may be considered non-critical. In at least some instances such situational assessments by the controller 304 may be based in whole or in part on information and/or environmental data acquired directly by the controller 304 (e.g., through the use of onboard sensors). In other instances such situational assessments by the controller 304 may be based in whole or in part on information and/or environmental data acquired indirectly by the controller 304 (e.g., through the use of a communicable coupling to one or more external systems or devices capable of providing relevant environmental data).

In at least some implementations, the controller 304 can selectively reduce the energy made available to one or more non-critical, range critical, or performance critical vehicular systems in order to reduce the current flow from the electrical energy storage device 118. In general, reducing the current flow from the electrical energy storage device 118 reduces the heating of the electrical energy storage device 118. In at least some implementations, reducing the temperature of the electrical energy storage device 118 can increase the available energy stored in the electrical energy storage device 118.

In one implementation, the controller 304 can perform a stepwise reduction in energy made available to vehicular systems. For example, the controller 304 can control or otherwise limit the energy made available to one or more non-critical, range critical, or performance critical vehicular systems by a fixed percentage of the load presented (e.g., a non-critical vehicular system presenting a 100 Watt (W) load may be reduced in 10 W steps, 90 W, 80 W, and so on). In some instances, the controller 304 can selectively disable a non-critical, range critical, or performance critical vehicular system rather than making energy available to the system at a level at which may damage or otherwise compromise the performance, reliability, or longevity of the vehicular system. For example, damage may occur to the non-critical 100 W load discussed above if power mad available to the system is reduced to less than 60 W. In such instances, rather than reduce power to less than 60 W, the controller 304 may simply disable the operation of the non-critical vehicular system.

In one implementation, the controller 304 can selectively reduce the energy supplied to one or more vehicular systems based on the demand presented by the system. Such a power reduction regime can beneficially provide the greatest reduction in energy draw from the electrical energy storage device 118 while limiting the impact of the reduction to the fewest number of vehicular systems. For example, if five non-critical systems present loads of 100 W, 80 W, 60 W, 40 W, and 20 W, the controller 304 selectively stepwise reduces the energy made available to the system presenting the greatest load on the electrical energy storage device 118 (i.e., selectively reduces the 100 W load to 80 W). The controller 304 can share subsequent reductions in energy made available to the vehicular systems between the two or more systems presenting the greatest load on the electrical energy storage device 118 (i.e., equal reductions to two 80 W load systems to 60 W), and so on.

In at least some implementations, some or all of the thermal data collected by the thermal sensors 210 can be stored in the form of a thermal profile 430 in the nontransitory storage media 220. In addition, a real time clock or similar timekeeper that is internal or external to the electrical energy storage device 118 can supply data representative of the time-of-day and date for each temperature reading stored in the nontransitory storage media 220. Additionally, geo-location coordinates of the vehicle 100 that are generated or otherwise provided by a global positioning system ("GPS") network or other terrestrial geolocation or triangulation networks and/or systems may logically associated with each temperature reading stored in the nontransitory storage media 220. In some instances, the controller 304 supplies the time-of-day and date information in whole or in part. Additionally or alternatively, parametric data representative of the operating parameters of one or more vehicular systems may also be stored in the nontransitory storage media 220 in the form of a thermal operational profile 432. In at least some instances, such vehicular parametric data may be logically associated with some or all of the temperature data stored in the nontransitory storage media. The logical association of vehicular parametric data with thermal conditions in the electrical energy storage device 118 can provide important insight into the performance of the electrical energy storage devices 118 under typical operating conditions. The logical association of vehicular parametric data with thermal conditions in the electrical energy storage device 118 can additionally provide important insight into the performance of the electrical energy storage devices 118 on a per user basis. Associating an electrical energy storage device 118 thermal profile with a particular user, provides the ability to market products and services to particular users based at least in part on the association. Associating an electrical energy storage device 118 thermal profile with a particular user additionally provides the ability to provide electrical energy storage device 118 lease terms to particular users based at least in part on the association.

Figure 5:
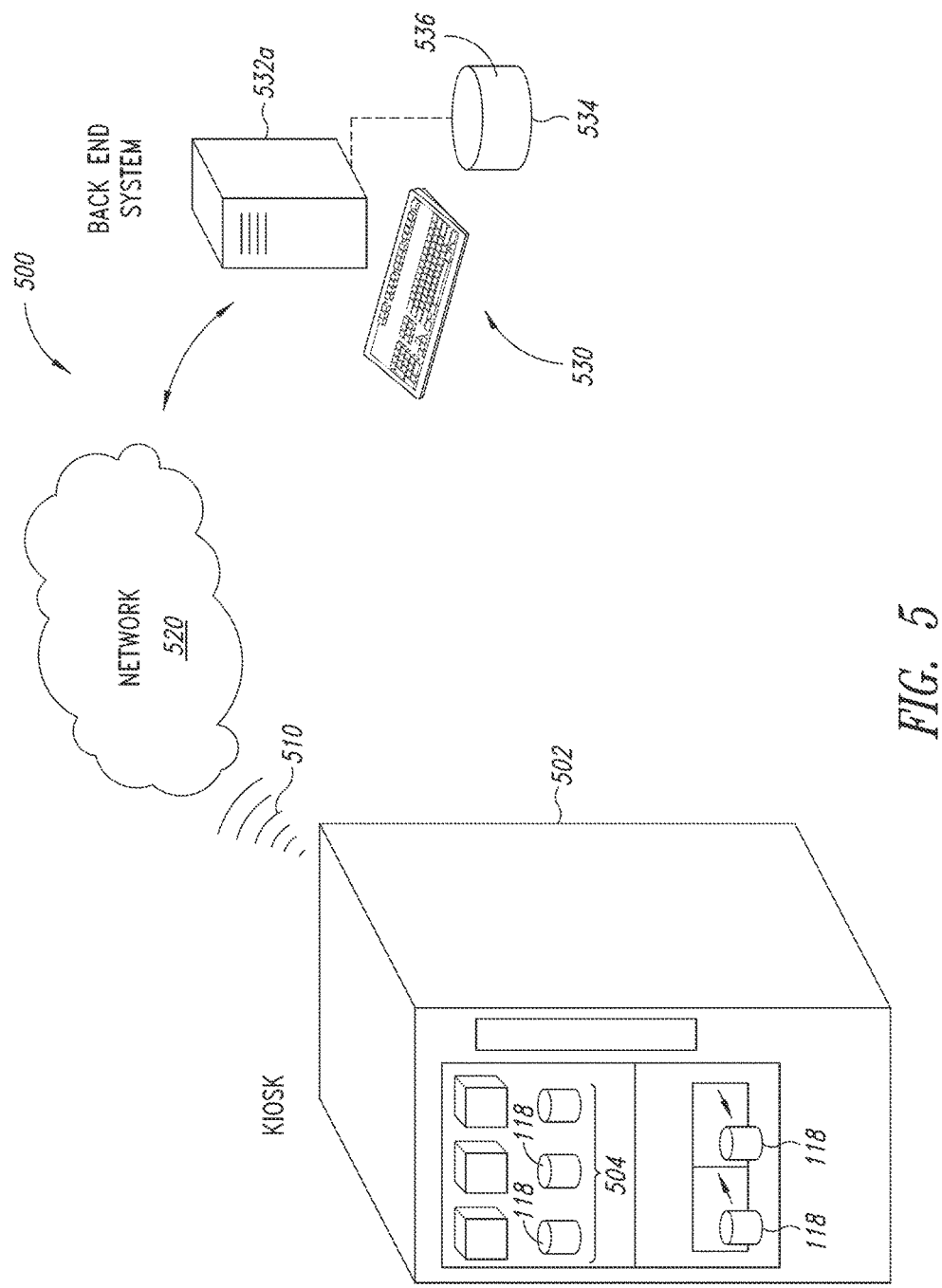
FIG. 5 is a schematic diagram of an environment including one or more locations for exchanging, acquiring, or replenishing an energy or power storage device, and a backend system communicatively coupled by a communications infrastructure, according to one non-limiting illustrated embodiment.

FIG. 5 shows an environment including a station, rack, or kiosk 502 for exchanging an expended electrical energy storage device 118 for an at least partially charged electrical energy storage device 504. In at least some implementations, the kiosk 502 is communicably coupled 510 via one or more networks 520 to one or more back end systems 530.

Although FIG. 5 depicts only one kiosk 502, a geographic area, for example a city or town, or a county or other region, may contain any number of such kiosks 502. Such kiosks 502 can automatically collect, charge, and distribute electrical energy storage devices 118. Alternatively, individuals may staff such kiosks 502 to manually collect, charge, and distribute the electrical energy storage devices 118. Typically, each kiosk 502 will maintain an inventory 504 of energy or power storage devices, which may be in various charge states and/or conditions. The kiosk 502 provides an exchange point where a used can exchange a discharged or depleted electrical energy storage device 118 for a more fully charged electrical energy storage device 118. A network of such kiosks 502 can advantageously increase a user's confidence in the reliability and usability of electric vehicles such as an electric scooter 100 or similar electric vehicle. By increasing the user's confidence in the reliability of electric vehicles, widespread acceptance of such vehicles is beneficially enhanced.

The environment 500 includes one or more backend systems 530 including one or more backend servers 532a (only one shown), which is configured to track the kiosks 502 at which an electrical energy storage device 118 may be replaced or replenished. The backend system 530 includes a nontransitory medium 534 (e.g., hard disk) which maintains a database or other information structure 536 of the various kiosks 502. Such information may include geographic coordinates of the various kiosks 502, for example specified in longitude and latitude and/or specified by street address. Such may also include a current inventory 504 of electrical energy storage devices 118 in stock in each kiosk 502. In some instances, the database 536 may include data indicative of the number of electrical energy storage devices 118 available at a particular kiosk 502. In some instances, the database 536 may include data indicative of the charge condition of the electrical energy storage devices 118 available at a particular kiosk 502.

In some instances, database 536 may include data indicative of the thermal profiles 430 or thermal performance profiles 432 of the electrical energy storage devices 118 available at a particular kiosk 502. Importantly, the availability of thermal profile 430 information can advantageously permit the kiosk 502 and/or the backend system 530 to identify electrical energy storage devices 118 having compromised energy storage capabilities. By identifying electrical energy storage devices 118 having such compromised capabilities users of such compromised devices may be provided with one or more concessions (e.g., a lease discount, a free "rental," or other cash or promotional offers) thereby improving the acceptance of such an electrical energy storage device 118 exchange environment (i.e., the perception of value by a user receiving a compromised electrical energy storage device is improved by recognizing the loss in value of a compromised electrical energy storage device).

In other instances, an individual user's vehicle operating habits can be assessed using either or both the thermal profile 430 or thermal performance profile 432 information stored in the backend system 530. Such an assessment can permit the generation of user specific promotions and offers by the backend system 530 based on the manner in which a user operates their vehicle under "real world" conditions. For instance, a user may prefer full throttle starts (i.e., "jack-rabbit" starts) that cause a high current drain on the electrical energy storage device 118. In an operating environment where a high number of such starts are inevitable (i.e., an urban environment), such a user may receive a promotional offer for a second electrical energy storage device plan upon exchanging a discharged electrical energy storage device at a kiosk 502. Alternatively, if such full throttle starts are found to compromise the life expectancy of the electrical energy storage device 118, such a user may be presented with a higher lease cost that reflects the decreased life expectancy of the electrical energy storage devices 118 based on their driving habits.

The environment 500 may include a communications infrastructure or network 520 that allows or facilitates communications between various components, for example between the backend system 530 and the various kiosks 502 at which electrical energy storage devices 118 may be exchanged, replaced, or replenished and/or one or more vehicles 100. The communications infrastructure 520 may take a large variety of forms, and may include different distinct components and systems, for example wired or optical cable components or systems and/or wireless components or systems. For example, the communications infrastructure 520 may include a cellular communications network provided by a cellular communications service provider including base stations. Such may allow data communications over wireless infrastructures, for example communications with the vehicle 100. Some of the components may be communicably coupled over a wired network, for instance Plain Old Telephone Service (POTS) network. In at least some instances, fixed components such as the backend system 530 and the plurality of kiosks 502 may be communicably coupled via conventional telephone wires. Alternatively, the backend system 530 and the plurality of kiosks 502 may be communicatively coupled via the Internet, or some other network (e.g., extranet, internet), which may employ wired, wireless and/or combinations of wired and wireless communications paths or channels.

Figure 6:
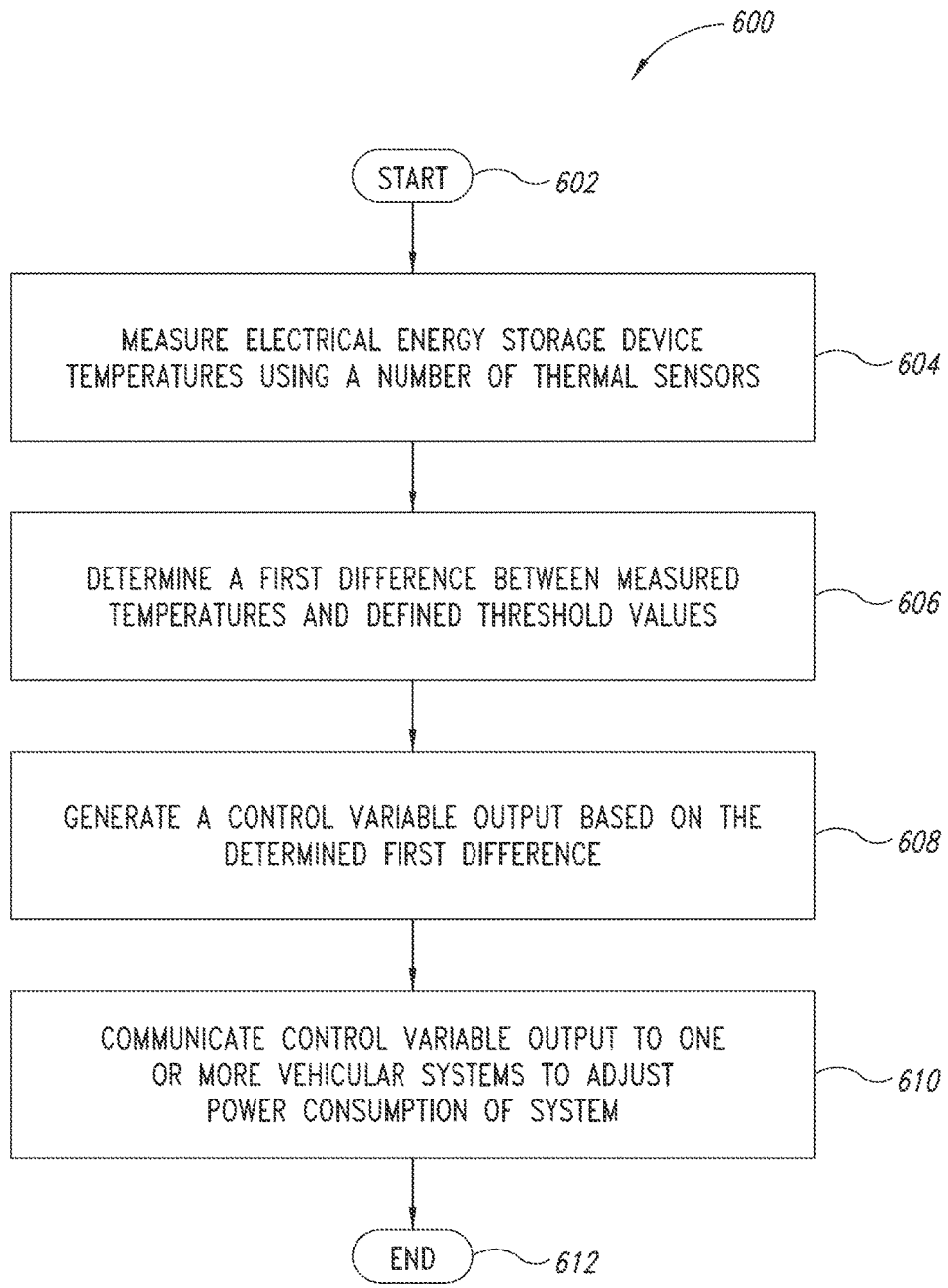
FIG. 6 is a flow diagram showing a high-level method of operating the components or structures of FIGS. 2-4 to control operation of one or more electric vehicle systems to maintain a desired temperature in the electrical energy storage device powering the vehicle, according to one non-limiting illustrated embodiment.

FIG. 6 shows an illustrative thermal compensation method 600 according to one or more embodiments. As the electric vehicle 100 draws power from the electrical energy storage device 118, the temperature of the electrical energy storage device 118 will increase. If no weak or otherwise compromised power cells 202 are present in the electrical energy storage device 118 such heating will take the form of an overall rise in temperature across the electrical energy storage device 118. Such heating will be at least partially relatable to the current demand of the various vehicular systems operably coupled to the electrical energy storage device 118. If weak or otherwise compromised power cells 202 are present in the electrical energy storage device, in addition to the overall temperature rise across the electrical energy storage device 118, a localized temperature increase that is greater than the overall temperature rise across the electrical energy storage device 118 may occur in the vicinity of the weakened or compromised power cells 202. In at least some instances, a network of thermal sensors 210 can be disposed throughout the electrical energy storage device 118 to detect both the overall increase in temperature of the electrical energy storage device as well as any localized heating which may occur in the electrical energy storage device 118. The method 600 commences at 602.

At 604, a number of electrical energy storage device 118 temperatures are measured using any number of thermal sensors 210. Such thermal sensors 210 measure any number of individual or spot temperatures representative of an overall temperature of the electrical energy storage device 118 and/or localized temperatures at various individual electrical energy storage cells, locations, points, zones, or regions within the electrical energy storage device 118. The data representative of the measured temperature(s) may be combined or analyzed using one or more algorithms. For example, an average of some or all of the measured spot or individual temperatures may provide the overall electrical energy storage device 118 temperature. In another example, the measured temperature of a number of thermal sensors proximate one or more power cells 202 or power cell stacks 204 may be combined to provide a thermal profile of a location, point, zone, or region corresponding to the temperature of one or more cells or cell stacks.

At 606, the controller 304 determines one or more first difference(s). In at least some implementations, the first difference(s) can be determined using the data indicative of one or more measured or determined temperature(s) in the electrical energy storage device 118 and one or more respective defined threshold value(s). In at least some implementations, the one or more defined threshold value(s) may be stored in whole or in part in the nontransitory read-only memory 322 and/or the nontransitory random access memory 324.

At 608, the controller 304 generates a control variable signal output 406 based at least in part on the first difference(s) determined at 606. The controller 304 generates the control variable signal output 406 using a defined control algorithm intended to limit the first difference(s) to an acceptable range. In at least some instances, the control algorithm can include proportional control, integral control, derivative control, or any combination thereof. In some instances, such control algorithms may include time constants and other factors to improve the responsiveness of the controller 304.

At 610, the controller 304 communicates the control variable signal output 406 to at least one vehicular system. The control variable signal output 406 causes and adjustment in the power consumption of the at least one vehicular system. By decreasing the power consumption of the at least one vehicular system, the current demand on and consequently the thermal output of the electrical energy storage device 118 is reduced. The method 600 concludes at 612.

Figure 7:
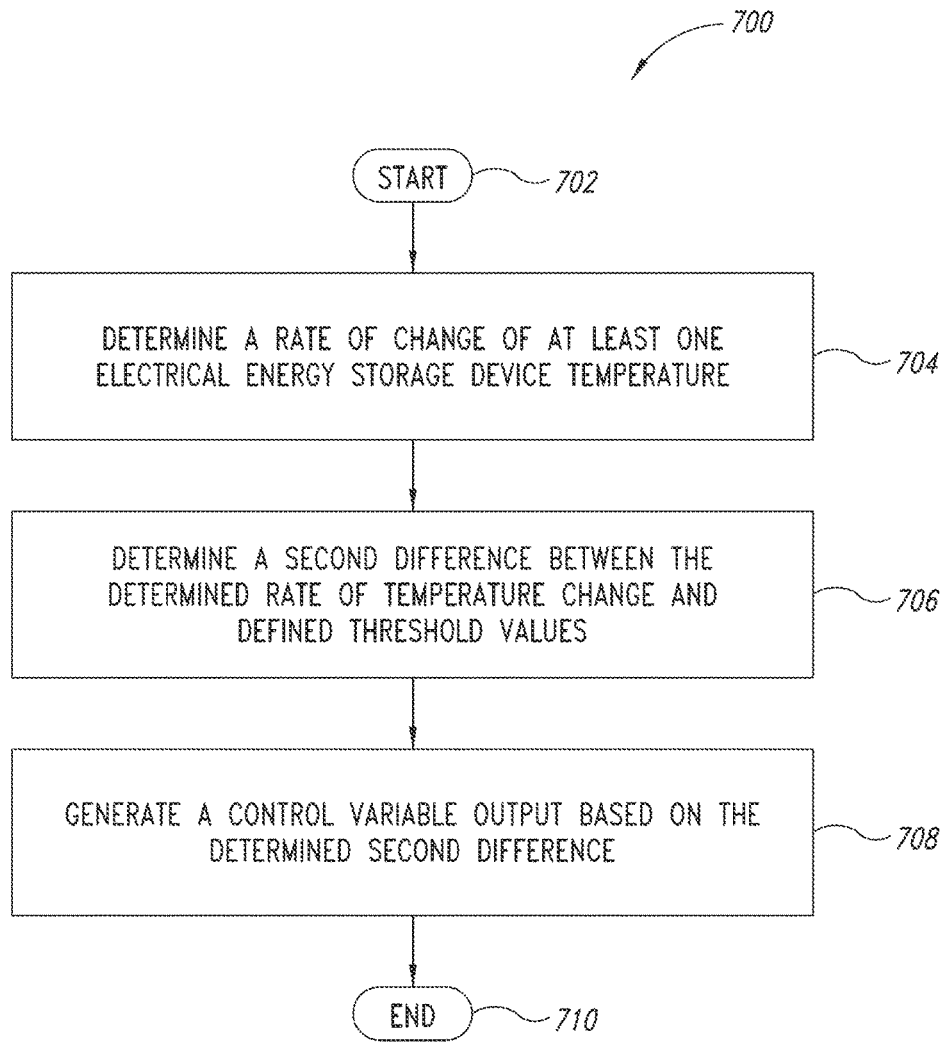
FIG. 7 is a flow diagram showing a high-level method of operating the components or structures of FIGS. 2-4 to control operation of one or more electric vehicle systems to maintain a desired rate of temperature change in the electrical energy storage device powering the vehicle, according to one non-limiting illustrated embodiment.

FIG. 7 shows an illustrative thermal compensation method 700 based on the rate of temperature change in an electrical energy storage device 118 according to one or more embodiments. Generally, as described above with regard to FIG. 6, electrical energy storage devices 118 tend to increase in temperature as the current demand placed upon the electrical energy storage device increases. Where such current demands are relatively constant, such temperature increases may occur gradually over time. Where such current demands are intermittently heavy (e.g., such as those that occur in response to a rapid, full throttle, acceleration), such temperature increases may occur rapidly over time. Thus, while a 5° C. increase in temperature over 20 minutes may be an acceptable rise based on a constant current demand, the same 5° C. rise over a 1 minute interval may be unacceptable in terms of compromising the availability of the charge remaining in the electrical energy storage device 118. Thus, in some instances, temperature rate of change (e.g., degrees C. or degrees F. per time interval) can provide additional insight on the availability of the charge remaining in the electrical energy storage device 118.

In at least some implementations, the method 700 can be combined with the method 600 described above to provide a control regime responsive to changes in electrical energy storage device temperature as well as the rate of change of the electrical energy storage device 118 temperatures. The method commences at 702.

At 704, the controller 304 determines a rate of temperature change in a number of thermal sensors 210 in the electrical energy storage device 118. Such thermal sensors 210 measure the rate of change in temperature for any number of individual or spot temperatures representative of an overall temperature of the electrical energy storage device 118 and/or localized temperatures at various individual electrical energy storage cells, locations, points, zones, or regions within the electrical energy storage device 118. The controller 304 can combine or analyze the data representative of the measured rate of temperature change using one or more defined algorithms rendered in controller readable, machine executable code. For example, an average of some or all of the measured spot or individual rates of temperature change may provide the overall electrical energy storage device 118 rate of temperature change. In another example the measured rate of temperature change of a number of thermal sensors proximate one or more power cells 202 or power cell stacks 204 may be combined to provide a cell or stack rate of temperature change.

At 706, the controller 304 determines one or more second difference(s). In at least some implementations, the second difference(s) can be determined using the data indicative of one or more determined temperature rate(s) of change in the electrical energy storage device 118 and one or more respective defined threshold value(s). In at least some implementations, the one or more defined threshold value(s) may be stored in whole or in part in the nontransitory read-only memory 322 and/or the nontransitory random access memory 324.

At 708, the controller 304 generates a control variable signal output 406 based at least in part on the second difference(s) determined at 706. The controller 304 generates the control variable signal output 406 using a defined control algorithm intended to limit the second difference(s) to an acceptable range. In at least some instances, the control algorithm can include proportional control, integral control, derivative control, or any combination thereof. In some instances, such control algorithms may include time constants and other factors to improve the responsiveness of the controller 304. The method 700 concludes at 710.

Figure 8:
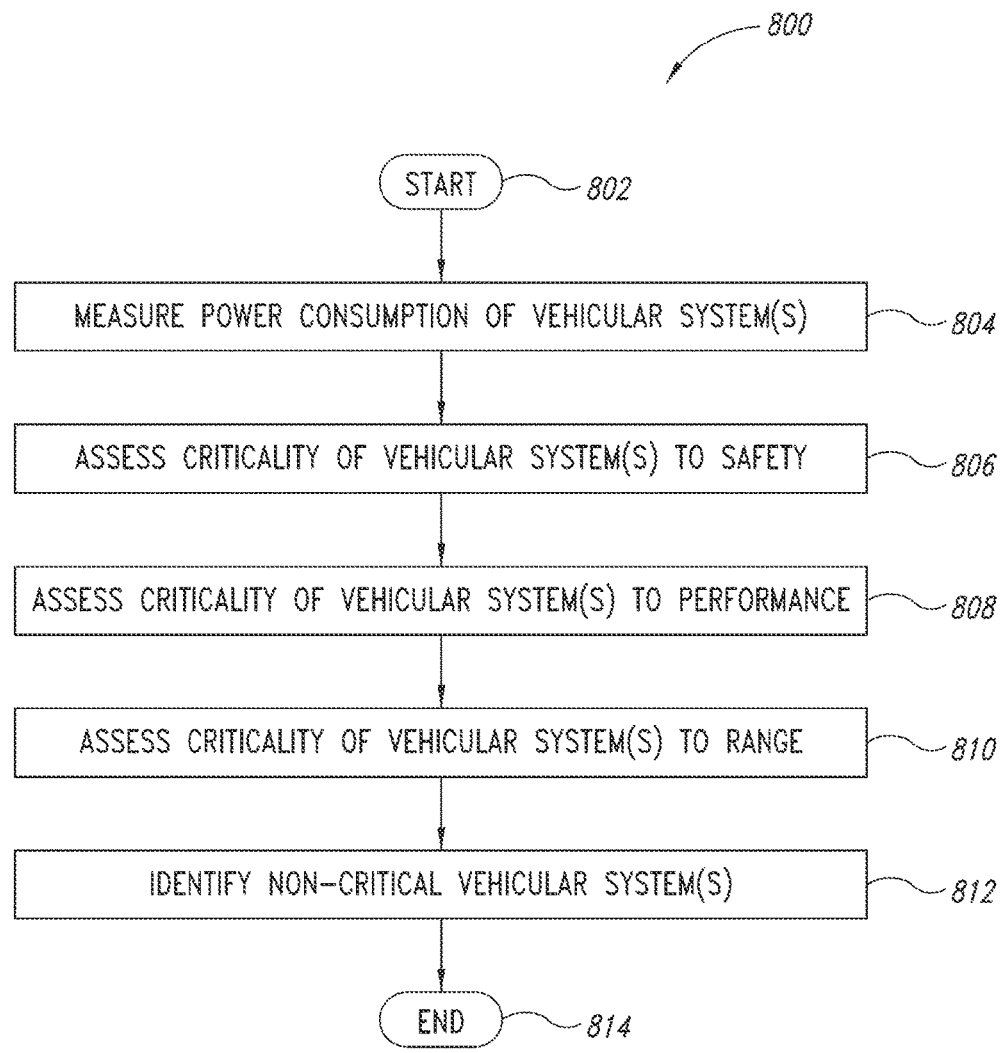
FIG. 8 is a flow diagram showing a high-level method of operating the components or structures of FIGS. 2-4 to selectively control the power allocation to a number of vehicular systems by measuring the power consumption and assessing the criticality of the vehicular systems, according to one non-limiting illustrated embodiment.

FIG. 8 shows an illustrative thermal compensation method 800 in which the controller 304 measures the power consumption and assesses the criticality of a number of vehicular systems. In an electric or electric hybrid vehicle, various vehicular systems place a current (or power) demand on the electrical energy storage device 118. In order to control the temperature or temperature rate of change of the electrical energy storage device 118 attributable to the load presented by various vehicular systems, the controller 304 must: (a) know which vehicular systems are operating; (b) determine the power consumption of each of the operating vehicular systems; and (c) assess the criticality of each of the operating vehicular systems. The method commences at 802.

At 804, the controller 304 determines or otherwise measures the power consumption and/or current draw of each vehicular system placing a current demand on the electrical energy storage device 118. System current (or power) demand may be determined or measured directly, for example using an ammeter or similar current measurement device disposed in the power circuit for some or all vehicular systems. System current (or power) demand may be determined or measured indirectly, for example by measuring a pulse width and/or frequency of a pulse width modulated ("PWM") signal provided to one or more power converters.

At 806, the controller 304 assesses each vehicular system to determine whether the system is critical for user safety or regulatory compliance. In at least some implementations, the controller 304 performs a situational assessment with the understanding that the criticality of a particular vehicular system to safety or regulatory compliance may vary with location, jurisdiction, season, or even time-of-day. In at least some implementations, the controller 304 performs such a situational assessment based at least in part on data or other information obtained from the read-only memory 222 and/or the random access memory 224. In other implementations, the controller 304 performs such a situational assessment based at least in part on data or other information obtained from one or more communicably coupled external sources. Such external sources may be communicably coupled to the controller 304 via one or more intervening networks that include a global positioning or similar geolocation service, the Internet and/or cellular communication networks.

At 808, the controller 304 assesses each vehicular system to determine whether the system is critical to vehicular performance. In at least some implementations, the controller 304 performs a situational assessment with the understanding that the criticality of a particular vehicular system to vehicular performance may vary with location, jurisdiction, season, or even time-of-day. In at least some implementations, the controller 304 performs such a situational assessment based at least in part on data or other information obtained from the read-only memory 222 and/or the random access memory 224. In other implementations, the controller 304 performs such a situational assessment based at least in part on data or other information obtained from one or more communicably coupled external sources. Such external sources may be communicably coupled to the controller 304 via one or more intervening networks that include a global positioning or similar geolocation service, the Internet and/or cellular communication networks.

At 810, the controller 304 assesses each vehicular system to determine whether the system is critical to vehicular range. In at least some implementations, the controller 304 performs a situational assessment with the understanding that the criticality of a particular vehicular system to vehicular range may vary with location, jurisdiction, season, or even time-of-day. In at least some implementations, the controller 304 performs such a situational assessment based at least in part on data or other information obtained from the read-only memory 222 and/or the random access memory 224. In other implementations, the controller 304 performs such a situational assessment based at least in part on data or other information obtained from one or more communicably coupled external sources. Such external sources may be communicably coupled to the controller 304 via one or more intervening networks that include a global positioning or similar geolocation service, the Internet and/or cellular communication networks.

At 812, the controller 304 identifies any remaining vehicular systems that are not classified as either safety critical, performance critical, or range critical as "non-critical" vehicular systems. Such systems commonly include items such as entertainment systems, vanity lighting systems, and the like. The method 800 concludes at 814.

Figure 9:
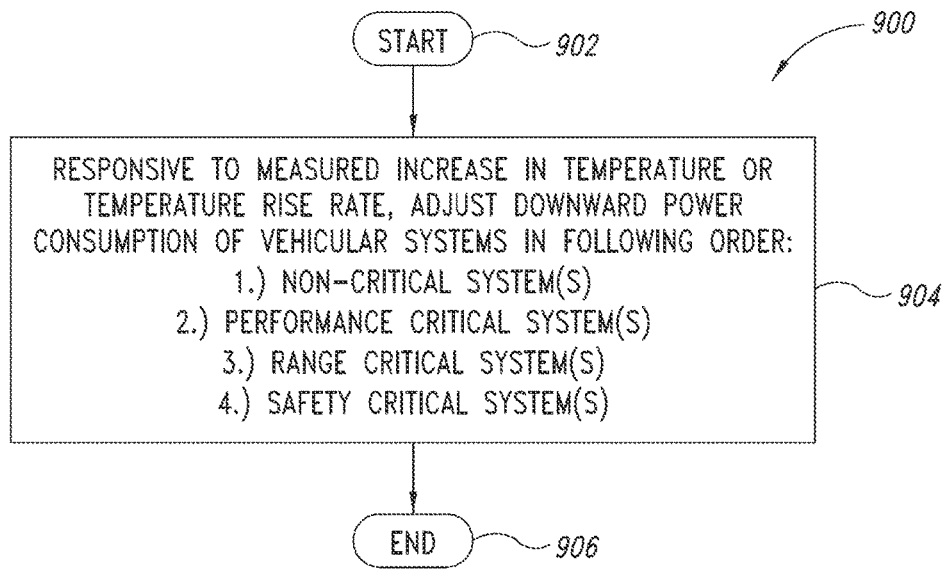
FIG. 9 is a flow diagram showing a high-level method of operating the components or structures of FIGS. 2-4 to selectively decrease the power allocation to a number of vehicular systems based on the assessed criticality and a defined organizational hierarchy, according to one non-limiting illustrated embodiment.

FIG. 9 shows an illustrative thermal compensation method 900 in which responsive to a measured or determined temperature or rate of temperature increase exceeding one or more defined thresholds, the controller 304 downwardly adjusts the power consumption of one or more vehicular systems. In at least some implementations the controller 304 can prioritize or arrange the sequence of such downward adjustments in power available to various vehicular systems based on the assessed degree of criticality of the respective systems. In at least some implementations, the controller 304 partially or completely precludes the adjustment of power available to some or all user safety critical or regulatory compliance critical vehicular systems. In other implementations, the controller 304 reduces the power available to one or more vehicular systems based at least in part on the assessed criticality of the vehicular system. The method 900 commences at 902.

At 904, the controller 304, in response to a detected temperature or temperature rate of change that falls outside of a defined threshold value or range, can downwardly adjust the quantity of energy made available to one or more vehicular systems. In at least some implementations, the controller 304 may make such adjustments in available energy based on a defined priority of vehicular system criticality. For example, the controller 304 can firstly make energy availability adjustments to non-critical vehicular systems. The controller 304 can secondly make energy availability adjustments to performance critical vehicular systems. The controller 304 can thirdly make energy availability adjustments to range critical vehicular systems. The controller 304 may or may not finally make power adjustments to safety or regulatory compliance critical vehicular systems.

The reduction in energy availability imposed by the controller 304 may or may not be the same for all vehicular systems. For example, the controller 304 may selectively reduce the available energy allocated to an on-board entertainment system prior to reducing the available energy allocated to an on-board vanity lighting system. In another example, the controller may selectively reduce the energy made available to a headlamp (normally considered a safety critical vehicular system) during daylight hours prior to reducing the energy available to an on-board entertainment system. The order and magnitude of the reduction in energy allocated or made available to each vehicular system therefore represents a number of operational and environmental factors.

In addition, in at least some implementations the vehicle user may influence the assessment of vehicular systems performed by the controller 304. For example, in one implementation a cellular telephone application or "app" can interface with at least a portion of the controller 304. Via the interface, the controller 304 can make available to the user the vehicular system assessment results. In at least some implementations, the app may allow the user to reassess the degree of criticality assigned by the controller 304 to a particular vehicular system. The method 900 concludes at 906.

Figure 10:
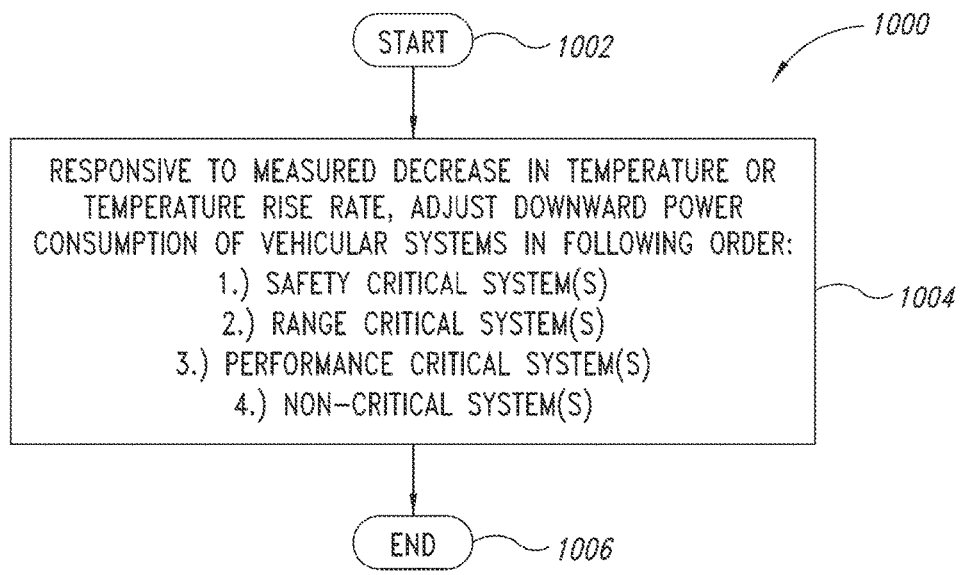
FIG. 10 is a flow diagram showing a high-level method of operating the components or structures of FIGS. 2-4 to selectively increase the power allocation to a number of vehicular systems based on the assessed criticality and a defined organizational hierarchy, according to one non-limiting illustrated embodiment.

FIG. 10 shows an illustrative thermal compensation method 1000 in which responsive to a measured or determined temperature or rate of temperature increase falling below one or more defined thresholds, the controller 304 upwardly adjusts the energy available to one or more vehicular systems. In at least some implementations, the controller 304 can prioritize or arrange the sequence of such upward adjustments in energy available to various vehicular systems based on the assessed degree of criticality of the respective systems. In at least some implementations, the controller 304 increases the energy available to one or more vehicular systems based at least in part on the assessed criticality of the vehicular system and/or the demand placed on the system by the vehicle user. The method 1000 commences at 1002.

At 1004, the controller 304, in response to a detected temperature or temperature rate of change that falls outside of a defined threshold value or range, can upwardly adjust or otherwise increase the energy available to one or more vehicular systems. In at least some implementations, the controller 304 may make such adjustments in available energy based on a defined priority of vehicular system criticality. For example, the controller 304 can firstly increase the energy availability to safety critical vehicular systems. The controller 304 can secondly increase the energy availability to range critical vehicular systems. The controller 304 can thirdly increase the energy availability to performance critical vehicular systems. The controller 304 may or may not finally increase the energy availability to non-critical vehicular systems. The method 1000 concludes at 1006.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers), as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES" and filed Jul. 26, 2011, U.S. provisional patent application Ser. No. 61/647,936 entitled "APPARATUS, METHOD AND ARTICLE FOR COLLECTION, CHARGING AND DISTRIBUTING POWER STORAGE DEVICES, SUCH AS BATTERIES" and filed May 16, 2012, U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011, U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011, U.S. provisional patent application Ser. No. 61/511,887 entitled "THERMAL MANAGEMENT OF COMPONENTS IN ELECTRIC MOTOR DRIVE VEHICLES" and filed Jul. 26, 2011, U.S. provisional patent application Ser. No. 61/647,941 entitled "THERMAL MANAGEMENT OF COMPONENTS IN ELECTRIC MOTOR DRIVE VEHICLES" and filed May 16, 2012, U.S. provisional patent application Ser. No. 61/511,880 entitled "DYNAMICALLY LIMITING VEHICLE OPERATION FOR BEST EFFORT ECONOMY" and filed Jul. 26, 2011, U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011, U.S. provisional patent application Ser. No. 61/581,566 entitled APPARATUS, METHOD AND ARTICLE FOR A POWER STORAGE DEVICE COMPARTMENT' and filed Dec. 29, 2011, U.S. provisional patent application Ser. No. 61/601,404 entitled "APPARATUS, METHOD AND ARTICLE FOR PROVIDING VEHICLE DIAGNOSTIC DATA" and filed Feb. 21, 2012, U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012, and U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012, U.S. application Ser. No. 13/559,314 filed on Jul. 26, 2012, naming Hok-Sum Horace Luke, Matthew Whiting Taylor and Huang-Cheng Hung as inventors and entitled "APPARATUS, METHOD AND ARTICLE FOR COLLECTION, CHARGING AND DISTRIBUTING POWER STORAGE DEVICES, SUCH AS BATTERIES", U.S. application Ser. No. 13/559,038 filed on Jul. 26, 2012, naming Hok-Sum Horace Luke and Matthew Whiting Taylor as inventors and entitled "APPARATUS, METHOD AND ARTICLE FOR AUTHENTICATION, SECURITY AND CONTROL OF POWER STORAGE DEVICES SUCH AS BATTERIES" U.S. application Ser. No. 13/559,054 filed on Jul. 26, 2012, naming Matthew Whiting Taylor, Yi-Tsung Wu, Hok-Sum Horace Luke and Huang-Cheng Hung as inventors and entitled "APPARATUS, METHOD, AND ARTICLE FOR PHYSICAL SECURITY OF POWER STORAGE DEVICES IN VEHICLES", U.S. application Ser. No. 13/559,390 filed on Jul. 26, 2012, naming Ching Chen, Hok-Sum Horace Luke, Matthew Whiting Taylor, Yi-Tsung Wu as inventors and entitled "APPARATUS, METHOD AND ARTICLE FOR PROVIDING VEHICLE DIAGNOSTIC DATA", U.S. application Ser. No. 13/559,343 filed on Jul. 26, 2012, naming Yi-Tsung Wu, Matthew Whiting Taylor, Hok-Sum Horace Luke and Jung-Hsiu Chen as inventors and entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE", U.S. application Ser. No. 13/559,064 filed on Jul. 26, 2012, naming Hok-Sum Horace Luke, Yi-Tsung Wu, Jung-Hsiu Chen, Yulin Wu, Chien Ming Huang, TsungTing Chan, Shen-Chi Chen and Feng Kai Yang as inventors and entitled "APPARATUS, METHOD AND ARTICLE FOR RESERVING POWER STORAGE DEVICES AT RESERVING POWER STORAGE DEVICE COLLECTION, CHARGING AND DISTRIBUTION MACHINES", U.S. Provisional Application Ser. No. 61/778,038 filed on Mar. 12, 2013, naming Hok-Sum Horace Luke as inventor and entitled "APPARATUS, METHOD AND ARTICLE FOR CHANGING PORTABLE ELECTRICAL POWER STORAGE DEVICE EXCHANGE PLANS", U.S. Provisional Application Ser. No. 61/780,781 filed on Mar. 13, 2013, naming Hok-Sum Horace Luke as inventor and entitled "APPARATUS, METHOD AND ARTICLE FOR PROVIDING INFORMATION REGARDING A VEHICLE VIA A MOBILE DEVICE", U.S. Provisional Application Ser. No. 61/773,614 filed on Mar. 6, 2013, naming Hok-Sum Horace Luke, Feng Kai Yang, and Jung-Hsiu Chen, as inventors and entitled "APPARATUS, METHOD AND ARTICLE FOR PROVIDING TARGETED ADVERTISING IN A RECHARGEABLE ELECTRICAL POWER STORAGE DEVICE DISTRIBUTION ENVIRONMENT", U.S. Provisional Application Ser. No. 61/789,065 filed on Mar. 15, 2013, naming Hok-Sum Horace Luke, Matthew Whiting Taylor, and Huang-Cheng Hung as inventors and entitled "MODULAR SYSTEM FOR COLLECTION AND DISTRIBUTION OF ELECTRIC STORAGE DEVICES", U.S. Provisional Application Ser. No. 61/773,621 filed on Mar. 6, 2013, naming Hok-Sum Horace Luke and Ching Chen as inventors and entitled "APPARATUS, METHOD AND ARTICLE FOR AUTHENTICATION, SECURITY AND CONTROL OF PORTABLE CHARGING DEVICES AND POWER STORAGE DEVICES, SUCH AS BATTERIES", U.S. application Ser. No. 13/918,703 filed on Jun. 14, 2013, naming Ching Chen, Matthew Whiting Taylor, Jui Sheng Huang, and Hok-Sum Horace Luke as inventors and entitled "APPARATUS, SYSTEM, AND METHOD FOR AUTHENTICATION OF VEHICULAR COMPONENTS" U.S. Provisional Application Ser. No. 61/862,852 filed on Aug. 6, 2013, naming Ching Chen, Alex Wu, Hok-Sum Horace Luke, and Matthew Whiting Taylor as inventors and entitled "SYSTEMS AND METHODS FOR POWERING ELECTRIC VEHICLES USING A SINGLE OR MULTIPLE POWER CELLS" are incorporated herein by reference, in their entirety. Aspects of the embodiments can be modified, if necessary, to employ systems, circuits and concepts of the various patents, applications and publications to provide yet further embodiments.

While generally discussed in the environment and context of power system for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. An electrical energy storage device thermal compensation system, the system comprising:
a plurality of thermal sensors, each of the thermal sensors configured to measure a respective temperature at a location in, on or proximate a vehicular electrical energy storage device;
at least one controller, communicably coupled to each of the plurality of thermal sensors, the controller configured to receive one or more process variable signals from each of the plurality of thermal sensors, each of the process variable signals including data indicative of a temperature sensed by the respective thermal sensor;

a controller-readable, machine-executable, instruction set stored in a nontransitory storage medium communicably coupled to the at least one controller, that when executed by the at least one controller, causes the at least one controller to at least:

for each of a number of the plurality of thermal sensors, determine a respective sensed temperature;

for each of the number of thermal sensors, determine a first difference between the sensed temperature and at least one temperature threshold value logically associated with the respective thermal sensor;

responsive at least in part to the determined first difference for at least some of the number of thermal sensors, provide at least one control variable signal output at a communications interface;

responsive at least in part to the determined first difference of at least some of the number of thermal sensors, communicate the at least one control variable signal output to at least one vehicular system, the at least one control variable signal output including at least one parameter; and while operating the vehicular electrical energy storage device, adjust power consumption of the at least one vehicular system based on the at least one parameter of the at least one control variable signal output in response to the first difference of at least some of the number of thermal sensors differing from a threshold range and based on a user thermal operating profile generated according to a user energy subscription plan.

2. The thermal compensation system of claim 1 wherein the controller-readable, machine-executable, instruction set includes additional instructions that further cause the at least one controller to:

stepwise adjust the at least one parameter of the at least one control variable signal output responsive to the determined first difference for each of the number of thermal sensors, wherein each of the stepwise parameter adjustments causes a change in power consumption of the respective vehicular system.

3. The thermal compensation system of claim 1 wherein the controller-readable, machine-executable, instruction set includes additional instructions that further cause the at least one controller to:

determine a criticality of the at least one vehicular system based on at least one of:
 an environmental condition;
 user safety and regulatory compliance;
 remaining vehicle range possible using the existing vehicular electrical energy storage device; and
 vehicular performance.

4. The thermal compensation system of claim 3 wherein the user thermal operating profile is generated based on vehicular paramedic data.

5. The thermal compensation system of claim 1 wherein the controller-readable, machine-executable, instruction set includes additional instructions that further cause the at least one controller to:

in response to a determined decrease in temperature sensed by one or more thermal sensors, using the at least one control variable signal, adjust upward the power consumption of the at least one vehicular system.

6. The thermal compensation system of claim 1 wherein the controller-readable, machine-executable, instruction set includes additional instructions that further cause the at least one controller to:

determine a sensed temperature change over a defined time interval for each of the plurality of thermal sensors; and determine an average electrical energy storage device temperature by averaging the sensed temperature of at least two of the plurality of thermal sensors.

7. The thermal compensation system of claim 1 wherein the controller-readable, machine-executable, instruction set includes additional instructions that further cause the at least one controller to:

determine a sensed temperature change over a defined time interval for each of the plurality of thermal sensors; and determine a component temperature of an electrical energy storage device component using the sensed temperature provided by at least two of the plurality of thermal sensors.

8. The thermal compensation system of claim 1 wherein the controller-readable, machine-executable, instruction set includes additional instructions that further cause the at least one controller to:

determine a temperature change rate logically associated with each of at least some of the plurality of thermal sensors; and determine a second difference between the determined temperature change rate and one or more defined temperature change rate thresholds logically associated with the respective thermal sensor.

9. The thermal compensation system of claim 8 wherein the controller-readable, machine-executable, instruction set includes additional instructions that further cause the at least one controller to:

stepwise adjust the at least one parameter of the at least one control variable signal output responsive to the determined second difference for at least some of the plurality of thermal sensors, wherein each stepwise parameter adjustment causes a change in power consumption of the respective vehicular system.

10. The thermal compensation system of claim 1 wherein the controller-readable, machine-executable, instruction set includes additional instructions that further cause the at least one controller to:

in response to a determined increase in temperature change rate that exceeds one or more defined temperature change rate thresholds, using the at least one control variable signal parameter, adjust downward the power consumption of the at least one vehicular system.

11. The thermal compensation system of claim 1 wherein the controller-readable, machine-executable, instruction set includes additional instructions that further cause the at least one controller to:

in response to a determined decrease in temperature change rate that exceeds one or more defined temperature change rate thresholds, using the at least one control variable signal parameter, adjust upward the power consumption of the at least one vehicular system.

12. The thermal compensation system of claim 1 wherein the controller-readable, machine-executable, instruction set includes additional instructions that further cause the at least one controller to:

store at least a portion of the data indicative of the determined sensed temperature change over a defined time interval for each of the plurality of thermal sensors in a nontransitory storage media coupled to the vehicular electrical energy storage device.

13. The thermal compensation system of claim 12 wherein the controller-readable, machine-executable, instruction set includes additional instructions that further cause the at least one controller to:
store at least a portion of data indicative of at least one vehicle operating parameter in the nontransitory storage media coupled to the vehicular electrical energy storage device.

14. The thermal compensation system of claim 12 wherein the controller-readable, machine-executable, instruction set includes additional instructions that further cause the at least one controller to:
store at least a portion of data indicative of a determined change in sensed temperature over time (dT/dt) logically associated with the respective thermal sensor in a nontransitory storage media coupled to the vehicular electrical energy storage device.

15. The thermal compensation system of claim 14 wherein the controller-readable, machine-executable, instruction set includes additional instructions that further cause the at least one controller to:
store at least a portion of data indicative of at least one vehicle operating parameter in the nontransitory storage media coupled to the vehicular electrical energy storage device.

16. The thermal compensation system of claim 1 wherein the controller-readable, machine-executable, instruction set includes additional instructions that further cause the at least one controller to:
communicate the at least one control variable signal output to a plurality of vehicular systems, the at least one control variable signal output including at least one parameter to selectively adjust a power distribution among the plurality of vehicular systems.

17. An electrical energy storage device thermal compensation system, the system comprising:
a plurality of thermal sensors, each of the thermal sensors configured to measure a respective temperature at a location in, on or proximate a vehicular electrical energy storage device;
at least one controller, communicably coupled to each of the plurality of thermal sensors, the controller configured to receive one or more process variable signals from each of the plurality of thermal sensors, each of the process variable signals including data indicative of a temperature sensed by the respective thermal sensor;
a controller-readable, machine-executable, instruction set stored in a nontransitory storage medium communicably coupled to the at least one controller, that when executed by the at least one controller, causes the at least one controller to at least:
for each of a number of the plurality of thermal sensors:
determine a respective sensed temperature;
determine a first difference between the sensed temperature and at least one temperature threshold value logically associated with the respective thermal sensor;
determine a respective temperature change rate;
determine a second difference between the determined temperature change rate and at least one defined temperature change rate threshold value logically associated with the respective thermal sensor;
responsive to the determined first difference for each of at least some of the number of thermal sensors and responsive to the determined second difference for each of at least some of the number of thermal sensors, provide at least one control variable signal output at a communications interface;
responsive at least in part to the determined first difference of at least some of the number of thermal sensors, communicate the at least one control variable signal output to at least one vehicular system, the at least one control variable signal output including at least one parameter;
determine a criticality of the at least one vehicular system based at least in part on an environmental condition; and
while operating the vehicular electrical energy storage device, adjust power consumption of the at least one vehicular system based on the at least one parameter of the at least one control variable signal output in response to the first difference of at least some of the number of thermal sensors differing from a threshold range and based on the determined criticality of the at least one vehicular system and a user thermal operating profile generated according to a user energy subscription plan.

18. An electrical energy storage device thermal compensation controller, the controller comprising:
a first signal interface for receipt of a number of process variable signals generated by each of a number of thermal sensors, each of the process variable signals including data indicative of a temperature in a respective location in, on or proximate a vehicular electrical energy storage device;
a second signal interface for output of a number of control variable signals, each of the control variable signals including at least one parameter to adjust the power consumption of one vehicular system;
at least one processor communicably coupled to the first signal interface and the second signal interface;
a nontransitory storage media communicably coupled to the at least one processor that includes a processor-readable, machine-executable, instruction set that when executed by the at least one processor, causes the at least one processor to:
for each of the number of thermal sensors, determine a respective sensed temperature;
for each of the number of thermal sensors, determine a first difference between the sensed temperature and at least one temperature threshold value logically associated with the respective thermal sensor;
responsive to the determined first difference for at least some of the number of thermal sensors, provide at least one control variable signal output at a communications interface;
responsive at least in part to the determined first difference of at least some of the number of thermal sensors, communicate the at least one control variable signal output to at least one vehicular system, the at least one control variable signal output including at least one parameter; and
while operating the vehicular electrical energy storage device, the operating including supplying current from the vehicular electrical energy storage device to the at least one vehicular system, adjust power consumption of the at least one vehicular system based on the at least one parameter of the at least one control variable signal output in response to the first difference of at least some of the number of thermal sensors differing from a threshold range and based on a user thermal operating profile generated according to a user energy subscription plan.

19. The controller of claim 18 wherein the processor-readable, machine-executable, instruction set further causes the at least one processor to:
   determine a temperature change rate for each of at least some of the number of thermal sensors; and
   determine a second difference between the determined temperature change rate and one or more defined temperature change rate thresholds logically associated with the respective thermal sensor.

20. The controller of claim 18 wherein the controller-readable, machine-executable, instruction set further causes the at least one controller to:
   stepwise adjust the at least one parameter of the at least one control variable signal output responsive to the determined first difference for each of at least some of the number of thermal sensors, wherein each of the stepwise parameter adjustment causes a change in power consumption of the respective vehicular system.

21. The controller of claim 20 wherein the controller-readable, machine-executable, instruction set further causes the at least one controller to:
   determine the criticality of the at least one vehicular system based on user safety and vehicular performance; and
   in response to a determined increase in temperature sensed by one or more thermal sensors, using the at least one control variable signal, adjust downward the power consumption of the at least one vehicular system.

22. The controller of claim 21 wherein the controller-readable, machine-executable, instruction set further causes the at least one controller to:
   in response to a determined decrease in temperature sensed by one or more thermal sensors, using the at least one control variable signal, adjust upward the power consumption of the at least one vehicular system.

23. The controller of claim 21 wherein the user thermal operating profile is generated based on vehicular paramedic data.

24. An electrical energy storage device thermal compensation method, the method comprising:
   determining by at least one controller, a sensed temperature for each of a plurality of thermal sensors disposed in, on or proximate a vehicular electrical energy storage device;
   determining a first difference between the determined sensed temperature for each of a number of the plurality of thermal sensors and at least one temperature threshold value logically associated with the respective thermal sensor;
   responsive to the determined first difference for at least some of the number of thermal sensors, providing at least one control variable signal output at a communications interface;
   responsive at least in part to the determined first difference of at least some of the number of thermal sensors, communicating the at least one control variable signal output to at least one vehicular system, the at least one control variable signal output including at least one parameter; and
   while operating the vehicular electrical energy storage device, adjust power consumption of the at least one vehicular system based on the at least one parameter of the at least one control variable signal output in response to the first difference of at least some of the number of thermal sensors differing from a threshold range and based on a user thermal operating profile generated according to a user energy subscription plan.

25. The method of claim 24, further comprising:
   determining a temperature change rate for each of at least some of the plurality of thermal sensors; and
   determining a second difference between the determined temperature change rate and one or more defined temperature change rate thresholds logically associated with the respective thermal sensor.

26. The method of claim 24, further comprising:
   stepwise adjusting the at least one parameter of the at least one control variable signal output responsive to the determined difference for each of at least some of the number of thermal sensors, wherein each stepwise parameter adjustment causes a change in power consumption of the respective vehicular system.

27. The method of claim 24, further comprising:
   determining a criticality of the at least one vehicular system based on at least one of:
      an environmental condition;
      user safety and regulatory compliance;
      remaining vehicle range possible using the existing vehicular electrical energy storage device; and
      vehicular performance; and
   in response to a determined increase in temperature sensed by each of at least some of the number of thermal sensors, using the at least one control variable signal, adjusting downward the power consumption of the at least one vehicular system.

28. The method of claim 27 wherein the user thermal operating profile is generated based on vehicular paramedic data.

29. The power cell thermal compensation method of claim 24, further comprising:
   in response to a determined decrease in temperature sensed by each of at least some of the number of thermal sensors, using the at least one control variable signal, adjusting upward the power consumption of the at least one vehicular system.

* * * * *